US009993983B2

(12) United States Patent
Nishimura

(10) Patent No.: US 9,993,983 B2
(45) Date of Patent: Jun. 12, 2018

(54) REPAIRING METHOD FOR COMPOSITE MATERIAL AND COMPOSITE MATERIAL USING THE SAME

(75) Inventor: Toshihiko Nishimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 361 days.

(21) Appl. No.: 13/519,388

(22) PCT Filed: Feb. 25, 2011

(86) PCT No.: PCT/JP2011/054257

§ 371 (c)(1), (2), (4) Date: Jun. 27, 2012

(87) PCT Pub. No.: WO2011/105540

PCT Pub. Date: Sep. 1, 2011

(65) Prior Publication Data

US 2012/0301702 A1 Nov. 29, 2012

(30) Foreign Application Priority Data

Feb. 26, 2010 (JP) ................................ 2010-043542

(51) Int. Cl.
*B23P 23/00* (2006.01)
*B23P 6/00* (2006.01)
(Continued)

(52) U.S. Cl.
CPC .............. *B29C 73/04* (2013.01); *B29C 65/56* (2013.01); *B29C 73/06* (2013.01); *B64F 5/40* (2017.01);
(Continued)

(58) Field of Classification Search
CPC .......... B29C 73/04; B64F 5/0081; B64F 5/00; Y10T 29/49732; Y10T 29/49718;
(Continued)

(56) References Cited

U.S. PATENT DOCUMENTS 3,215,243 A * 11/1965 Dickerson ...................... 156/94
3,365,097 A * 1/1968 Chase ............................ 52/514
(Continued)

FOREIGN PATENT DOCUMENTS

DE 39 09 560 9/1990
DE 101 25 559 11/2002
(Continued)

OTHER PUBLICATIONS

Office Action dated Apr. 10, 2014 in corresponding Canadian Application No. 2,785,859.
(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A repairing method for a repaired composite material and a composite material using this method, which are capable of readily repairing, in a short time, a gap due to delamination generated between layers of completely hardened composite material. In the repairing method for composite material, a hole (4) is formed through the delamination (3) generated between layers (1*a*, 1*b*) of hardened composite material, and a joining member (6) is inserted into the hole (4) so as to join the delamination (3) generated between the layers (1*a*, 1*b*) of the hardened composite material.

12 Claims, 18 Drawing Sheets

(51) Int. Cl.
*B29C 73/00* (2006.01)
*B29C 73/04* (2006.01)
*B64F 5/40* (2017.01)
*B29C 65/56* (2006.01)
*B29C 73/06* (2006.01)

(52) U.S. Cl.
CPC .................... *Y10T 29/49732* (2015.01); *Y10T 428/249923* (2015.04)

(58) Field of Classification Search
CPC ..... B23P 2700/00; B23P 2700/01; B23P 6/00; B23P 8327/08; B20C 73/04; B23B 27/00
USPC .............. 29/402.09, 402.01, 402.02, 402.11, 29/402.12, 402.18, 402.19, 525.01
See application file for complete search history.

(56) References Cited

U.S. PATENT DOCUMENTS 3,527,629 A * 9/1970 Wylde ............................ 156/72
3,834,832 A * 9/1974 Mallinder et al. ............ 416/230
4,367,111 A * 1/1983 Hirose .......................... 156/221
4,556,439 A * 12/1985 Bannink, Jr. .................. 156/92
4,755,904 A * 7/1988 Brick ............................ 361/117
4,858,853 A * 8/1989 Westerman et al. .......... 244/119
4,916,880 A * 4/1990 Westerman, Jr. ............... 52/514
4,978,404 A 12/1990 Westerman, Jr.
5,023,987 A * 6/1991 Wuepper et al. .......... 29/402.11
5,034,254 A * 7/1991 Cologna et al. ................ 428/63
5,190,611 A 3/1993 Cologna et al.
5,424,105 A * 6/1995 Stewart ........................ 428/40.7
5,439,479 A * 8/1995 Shichman .......... A61B 17/0643 411/457
5,466,087 A * 11/1995 Doole ................... E04B 1/2604 403/230
5,851,645 A * 12/1998 Glowasky et al. ........... 428/221
5,868,886 A * 2/1999 Alston et al. ................... 156/98
5,893,534 A * 4/1999 Watanabe ..................... 244/119
5,928,448 A * 7/1999 Daws .............................. 156/98
5,948,505 A * 9/1999 Puppin .......................... 428/121
6,149,749 A * 11/2000 McBroom ....................... 156/94
6,168,358 B1 * 1/2001 Engwall et al. .............. 409/219
6,385,836 B1 * 5/2002 Coltrin ....................... 29/402.18
6,454,598 B1 * 9/2002 Burwell ................. H01R 4/726 174/84 C
6,770,349 B2 * 8/2004 Itoh et al. ....................... 428/73
6,995,099 B1 * 2/2006 Nishimura et al. ............. 442/59
7,008,689 B2 * 3/2006 Hawkins ................... B32B 3/08 428/212
7,368,073 B2 * 5/2008 Krogager et al. ......... 264/36.22
7,686,905 B2 * 3/2010 Ackerman et al. ............. 156/94
7,768,771 B2 * 8/2010 Lin ........................ H01G 9/016 361/502
7,875,141 B2 * 1/2011 Bogue ..................... B29C 73/06 156/153
8,201,371 B2 * 6/2012 Kismarton .............. B29C 65/08 248/188.2
8,584,986 B2 * 11/2013 Pina Lopez et al. ......... 244/119
8,808,294 B2 * 8/2014 Fox et al. ....................... 606/75
8,844,108 B2 * 9/2014 Miller et al. ............... 29/402.08
9,023,455 B2 * 5/2015 McKelvey Campbell ............... B23P 11/00 428/133
9,498,855 B2 * 11/2016 Gordon ..................... B23P 6/00
9,545,774 B1 * 1/2017 Heng ........................ B32B 7/08
9,695,533 B2 * 7/2017 Beraud .................. D04H 3/115
2001/0042501 A1 * 11/2001 Park ............................. 116/216
2002/0003021 A1 * 1/2002 Maxton ............. A61F 13/15764 156/199
2003/0075259 A1 * 4/2003 Graham .......................... 156/94
2003/0170441 A1 * 9/2003 Boyle ........................ 428/297.4
2003/0190455 A1 * 10/2003 Burgess et al. ............... 428/119
2004/0028858 A1 2/2004 Schnell
2004/0028877 A1 * 2/2004 Itoh et al. ..................... 428/118
2004/0122471 A1 * 6/2004 Toby .................. A61B 17/0644 606/219
2005/0125077 A1 * 6/2005 Harmon et al. ........... 623/23.72
2005/0224655 A1 * 10/2005 Guittard et al. .............. 244/133
2006/0068330 A1 * 3/2006 Kamijima ............. G03F 7/0387 430/311
2006/0096185 A1 * 5/2006 Dhellemmes et al. ......... 52/168
2006/0121265 A1 * 6/2006 Thompson et al. ....... 428/293.4
2006/0236652 A1 * 10/2006 Kismarton .................. 52/782.1
2007/0007955 A1 * 1/2007 Goldfine et al. .............. 324/240
2007/0087198 A1 * 4/2007 Dry .............................. 428/408
2007/0177330 A1 8/2007 Ackerman et al.
2008/0000193 A1 1/2008 Holland et al.
2009/0009929 A1 * 1/2009 Lin ........................ H01G 9/016 361/502
2009/0095147 A1 * 4/2009 Tunis et al. .................. 89/36.02
2009/0113994 A1 * 5/2009 Walker .................... G01M 3/26 73/40
2009/0126180 A1 5/2009 Keener
2009/0208691 A1 * 8/2009 Whitworth ................ B23P 6/00 428/63
2009/0282664 A1 11/2009 Holzhuter et al.
2010/0078259 A1 * 4/2010 Stevenson ............. B29C 53/562 181/290
2010/0145391 A1 * 6/2010 Kleiner ......................... 606/279
2010/0227112 A1 * 9/2010 Han ................................ 428/92
2010/0287776 A1 * 11/2010 Dantou et al. ............... 29/897.2
2010/0320320 A1 * 12/2010 Kismarton .............. B29C 43/24 244/119
2011/0174536 A1 * 7/2011 Wilson et al. .............. 174/84 S
2011/0177134 A1 * 7/2011 Harmon et al. .............. 424/400
2011/0209347 A1 * 9/2011 Deak et al. .................. 29/889.1
2012/0034089 A1 * 2/2012 Wadewitz ............... B29C 70/24 416/223 R
2012/0174292 A1 * 7/2012 Sneyd ....................... A41F 5/00 2/338
2012/0301702 A1 * 11/2012 Nishimura .................... 428/223
2013/0014367 A1 * 1/2013 Miller et al. ............... 29/402.08
2013/0025769 A1 * 1/2013 Stadtlander ..................... 156/93
2013/0209826 A1 * 8/2013 Ngo et al. ..................... 428/558
2013/0256376 A1 * 10/2013 Barton et al. .............. 227/176.1
2013/0327262 A1 * 12/2013 Shim et al. .............. 112/475.17
2013/0333315 A1 * 12/2013 Schroer et al. .............. 52/309.1
2014/0205800 A1 * 7/2014 Raghavendran et al. .... 428/141
2015/0165722 A1 * 6/2015 Yasaee ..................... C09D 1/00 428/58
2015/0224603 A1 * 8/2015 Bruck .................... B23K 35/30 442/228
2016/0265573 A1 * 9/2016 Neal ....................... F16B 19/00
2016/0288245 A1 * 10/2016 Ishino .................. B23K 35/302

FOREIGN PATENT DOCUMENTS

DE 10 2008 021 788 11/2009
JP 2-74325 3/1990
JP 3-286841 12/1991
JP 3-297629 12/1991
JP 5-501994 4/1993
JP 7-137154 5/1995
JP 2541620 10/1996
JP 10-243912 9/1998
JP 2002-1832 1/2002
JP 2006-187897 7/2006
JP 2009-208351 9/2009
WO 91/08892 6/1991

OTHER PUBLICATIONS

International Search Report dated Mar. 22, 2011 in corresponding International Application No. PCT/JP2011/054257.
Written Opinion of the International Searching Authority dated Mar. 22, 2011 in corresponding International Application No. PCT/JP2011/054257 (with English translation).
Notice of Allowance dated May 16, 2016 in Canadian patent application No. 2785859.

(56) References Cited

OTHER PUBLICATIONS

Extended European Search Report dated Dec. 21, 2017 in European Application No. 11747496.5.

* cited by examiner

REPAIRING METHOD FOR COMPOSITE MATERIAL AND COMPOSITE MATERIAL USING THE SAME

BACKGROUND OF THE INVENTION

1. Technical Field

The present invention relates to a repairing method for composite material for use as structural material of an aircraft or the like and a repaired composite material using this method, and in particular to join a delamination generated between layers of composite material that has been hardened.

2. Description of the Related Art

In general, examples of a repairing method for a delamination between layers of composite material for use in aircraft structural material or the like include a resin injection method as described in Japanese Unexamined Patent Application, Publication No. Hei 07-137154 (JP 07-137154), a gap filling method using repairing material after trimming as described in Japanese Patent No. 2541620, a pin or staple fitting method described in Japanese Unexamined Patent Application, Publication No. Hei 03-297629 (JP 03-297629) and Japanese Unexamined Patent Application, Publication No. Hei 02-74325 (JP 02-74325) and a stitching method using fiber as described in Japanese Unexamined Patent Application, Publication No. Hei 03-286841 (JP 03-286841).

SUMMARY OF THE INVENTION

1. Technical Problem

However, the invention described in JP 07-137154 has a difficulty in that a resin injection cannot be carried out if a delamination generated between layers of composite material is slight. The inventions of JP 07-137154 and JP 2541620 have difficulties in controlling each process of cleaning, drying and bonding, so that time required for a repairing operation becomes increased.

The invention described in JP 03-297629 has a difficulty in that the method is limited to the case of using thermoplastic composite material, and cannot be applicable to repairing for thermosetting composite material that cannot be softened by re-heating once the material has been hardened.

The inventions described in JP 02-74325 and JP 03-286841 have a difficulty in that the methods are limited to a stage where layers of composite material are still soft before they become cured, and cannot be applicable to repairing of composite material that has completely hardened.

The present invention has been made in the light of the above facts, and has an object is to provide a repairing method for composite material and a repaired composite material using this method, which are capable of readily repairing, in a short time, a delamination generated between layers of hardened composite material.

2. Solution to the Problem

In order to solve the above mentioned problems, the repairing method for composite material and the repaired composite material using this method according to the present invention provide the following solutions.

According to the repairing method for composite material of the first aspect of the present invention, a hole is drilled through a delamination generated between layers of hardened composite material, and a joining member is inserted into the hole so as to join the delamination gap.

The hole is formed through the delamination generated between the layers of the composite material, and the joining member is so inserted into the hole as to join the delamination. Accordingly, even the delamination generated between the layers of the hardened composite material can be readily bonded. As a result, it is possible to reduce the time required for repairing the delamination generated between the layers of the hardened composite material.

According to the repairing method for composite material of the above described aspect, a sleeve may be inserted into the hole, and the joining member may be inserted through the sleeve.

The sleeve is inserted into the hole formed through the delamination, and then, the joining member is inserted through the sleeve. Accordingly, the inner surface of the hole can be prevented from being damaged at the time of inserting the joining member through the hole and bending it. As a result, it is possible to prevent a further delamination from progressing, resulted from damage caused on the hole.

Further, it is possible to prevent galvanic corrosion in such a combination of materials that cause deterioration of the galvanic corrosion resistance when the joining member directly comes in contact with the composite material.

According to the repairing method for composite material of the above described aspect, a bending process may be applied to an end portion of the joining member that is inserted through the hole.

The end portion of the joining member inserted through the hole is bent in the bending process. Accordingly the joining member that joins the delamination can be prevented from becoming loose. As a result, it is possible to firmly join the delamination between the layers of the hardened composite material.

According to the repairing method for composite material of the above described aspect, an end portion of the joining member that is inserted through the hole may be crimped with a crimping member.

The end portion of the joining member that is inserted through the hole is crimped with the crimping member. Accordingly, the joining member that joins the delamination can be prevented from becoming loose, compared to the case without using the crimping member. As a result, it is possible to more firmly join the delamination generated between the layers of the hardened composite material.

According to the repairing method for composite material of the above described aspect, an end portion of the joining member that is inserted through the hole may be covered with a sealant.

The end portion of the joining member that is inserted through the hole and exposed on the surface of the layer of the composite material is covered with the sealant. Accordingly, water can be prevented from intruding between the joining member and the layers of the composite material. As a result, it is possible to readily and inexpensively prevent galvanic corrosion from being caused at the time of the repairing to join the delamination generated between the layers of the hardened composite material.

According to the repairing method for composite material of the above described aspect, a galvanic corrosion resistance material may be provided between the joining member and the layers of the composite material.

The galvanic corrosion resistance material is provided between the layers of the composite material and the joining member. Accordingly, the galvanic corrosion can be prevented from occurring when the joining member comes in contact with the layers of the composite material. As a result, it is possible to prevent the joining member from deteriorating, resulted from galvanic corrosion after the repairing of the delamination generated between the layers of the hardened composite material.

According to the repairing method for composite material of the above described aspect, the joining member may be in a quadrilateral cross sectional shape.

The delamination is joined by use of the joining member in a quadrilateral cross sectional shape. Accordingly, strength to join the delamination can be enhanced. As a result, it is possible to more firmly join the delamination generated between the layers of the hardened composite material.

According to the repairing method for composite material of the above described aspect, the joining member may include a staple having plural legs.

The delamination is joined by use of the staple having plural legs. Accordingly, it is possible to more firmly join the delamination generated between the layers of the composite material.

Further, there is no need to join the delamination by use of plural staples, thereby reducing the working time for joining the delamination.

According to the repairing method for composite material of the above described aspect, the staple may include four legs, and each of the legs may be provided on each side of the staple in a quadrilateral shape.

The staple is used as the joining member, which is configured such that each of the legs having a quadrilateral cross sectional shape is provided on each side of the staple body. Accordingly, the joining of the delamination generated between the layers of the hardened composite material can be firmer since the joining of the delamination is held by the legs in two directions vertical to each other at a time.

According to the repairing method for composite material of the above described aspect, the joining member may be a staple having legs made of reinforced fiber impregnated with thermoplastics resin or thermosetting resin.

The staple having the legs made of reinforced fiber impregnated with resin is used and the resin thereof is made to be hardened, thereby bonding the end portions of the legs to each other. Thus, the staple becomes into a loop, so that the delamination gap between the layers of the composite material can be joined more firmly.

There is no need to consider galvanic corrosion, which occurs in the case of using the staple of metal, so that the composite material and the joining member can be prevented from deteriorating.

According to the repairing method for composite material of the above described aspect, the joining member may be a blind rivet.

The blind rivet is used as the joining member. Thus, the blind rivet can be inserted through the hole and can be crimped. Accordingly, the joining can be readily carried out, compared to the case of using the staple. As a result, it is possible to reduce the repairing time for the delamination generated between the layers of the hardened composite material.

According to the repairing method for composite material of the above described aspect, the joining member may be provided with surface coating for galvanic corrosion prevention.

The joining member provided with the surface coating for galvanic corrosion prevention is used. Accordingly, occurrence of the galvanic corrosion can be prevented without providing the sleeve or the like. As a result, it is possible to readily repair the delamination generated between the layers of the composite material, and also reduce the repairing time therefor.

Further, since no sleeve is provided, it is possible to reduce the diameter of the hole drilled in the composite material. Thus, there is no need to break the fiber of the composite material through the drilling. Accordingly, it is possible to facilitate the drilling, and reduce influence of deterioration of strength in fiber of the composite material.

According to the repairing method for composite material of the above described aspect, the joining member may be made of shape memory alloy.

Shape memory alloy is used as material for the joining member. Accordingly, the joining member can be formed into a predetermined shape depending on the temperature change. As a result, it is possible to readily in a short time carry out the repairing to join the delamination between the layers of the hardened composite material by setting a predetermined temperature.

According to the composite material of the above described aspect, the composite material may be repaired by the repairing method for composite material according to any one of the descriptions in the above described aspect.

The repairing method capable of readily repairing the delamination generated between the layers of the hardened composite material is used. Accordingly, a short time repair is possible to even for the hardened composite material.

3. Advantageous Effects of the Invention

The hole is drilled through the delamination gap generated between the layers of the composite material, and the joining member is so inserted into the hole as to join the delamination. Accordingly, even the delamination generated between the layers of the hardened composite material can be readily joined. As a result, it is possible to reduce the time required for repairing the delamination generated between the layers of the hardened composite material.

DETAILED DESCRIPTION OF THE INVENTION

First Embodiment

FIGS. 1A to 1F are explanation drawings illustrating the repairing method for composite material according to the first embodiment of the present invention.

Figure 1A:
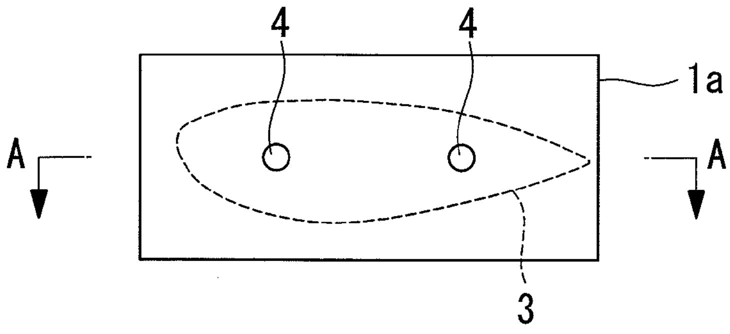
FIG. 1A is an explanation drawing illustrating the repairing method for composite material according to the first embodiment of the present invention, and is a top view of the composite material in which holes are drilled in the delaminated area generated between the layers of the composite material.
Figure 1B:
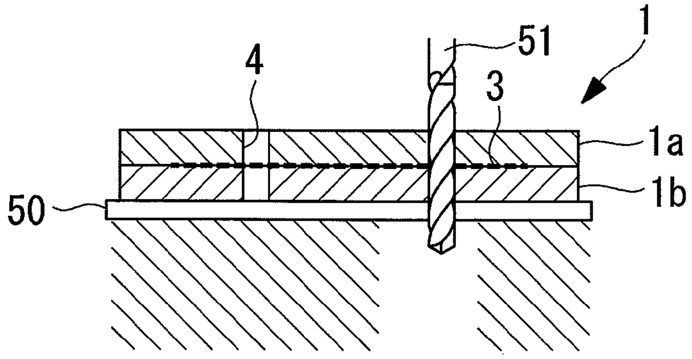
FIG. 1B is a cross sectional view taken along line A-A in FIG. 1A.

FIG. 1A is a top view illustrating composite material in which holes are formed in a delamination generated between layers of the composite material, FIG. 1B is a cross sectional view taken along line A-A in FIG. 1A, and FIG. 1A to FIG. 1F are explanation drawings illustrating the method of repairing the delamination between the layers of the composite material.

The composite material 1 is formed by laminating layers 1*a*, 1*b* of plural (for example, two) composite materials. Each of the layers 1*a*, 1*b* of the composite material is completely hardened. A delamination 3 is generated between the layer 1*a* and the layer 1*b* of the composite material completely hardened. The repairing method for the delamination 3 generated between the layers 1*a*, 1*b* of the composite material is carried out such that holes 4 are penetrated in the layer 1*a* and the layer 1*b* of the composite material completely hardened, and a staple (joining member) 6, which is to be described later, is inserted into the holes 4 so as to join the delamination.

A backing member 50 is disposed on a back side of the composite material where the delamination 3 exists between the layers 1*a*, 1*b*. The backing member 50 serves to prevent burrs from being generated when the holes 4 are drilled in the layer 1*a* and the layer 1*b* of the composite material. The holes 4 are drilled in the layers 1*a*, 1*b* of the composite material disposed on the backing member 50 downward from the top side by use of a drill 51 having a minute diameter (for example, 1.0 mm).

The holes 4 are so provided as to penetrate through the delamination 3 formed between the layer 1*a* and the layer 1*b* of the composite material. The holes 4 are drilled at plural (for example, two) positions in an area of the delamination 3. The diameter of the holes 4*a*, 4*b* is the same as that of the drill 51.

Figure 1C:
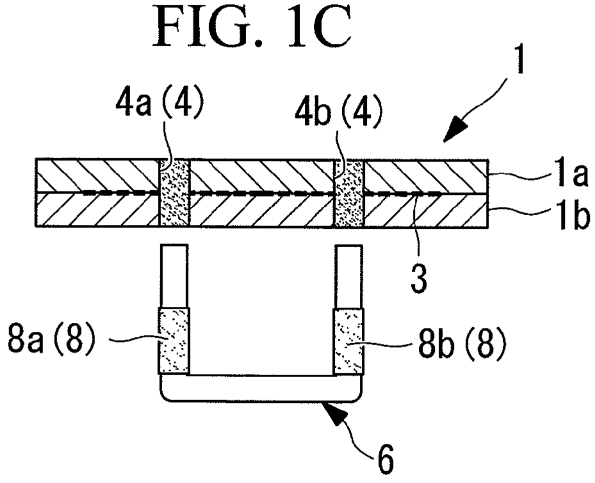
FIG. 1C is an explanation drawing illustrating the repairing method for the delamination generated between layers of the composite material.

After the holes 4*a*, 4*b* are drilled in the area of the delamination 3, adhesive is applied on the inner surface (inner wall) of each hole 4*a*, 4*b*, as illustrated in FIG. 1C. Similarly, adhesive is applied on the outer surface of each of two legs 8*a*, 8*b* of the staple 6. Instead of the adhesive, filling material may be used.

The staple 6 includes the two legs 8*a*, 8*b*. The staple 6 has a U-letter outer shape, as illustrated in FIG. 1C. The staple 6 is formed of material excellent in strength characteristics and capable of being cold-worked, such as beta-titanium, inconel or austenite stainless material. Each of the legs 8*a*, 8*b* of the staple 6 has a circular cross sectional shape vertical to the axial direction thereof. Each of the legs 8*a*, 8*b* has a diameter of 0.9 mm, for example, which is slightly smaller than that of the holes 4.

Figure 1D:
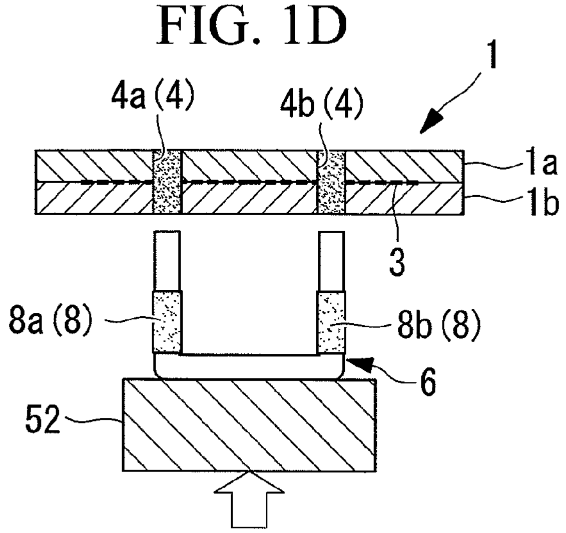
FIG. 1D is an explanation drawing illustrating the repairing method for the delamination generated between layers of the composite material.

After the adhesive is applied on the inner surface of each of the holes 4*a*, 4*b* and on the outer surface of each of the legs 8*a*, 8*b* of the staple 6, the legs 8*a*, 8*b* of the staple 6 are inserted into the respective holes 4*a*, 4*b* upward from the back side, as illustrated in FIG. 1D. When inserting the staple 6 into the holes 4*a*, 4*b*, the staple 6 is disposed on the top surface of the staple pushing tool 52 with the legs 8*a*, 8*b* thereof directing upward. The staple pushing tool 52 on which the staple 6 is disposed is pushed upward so as to insert the legs 8*a*, 8*b* into the respective holes 4*a*, 4*b*.

Figure 1E:
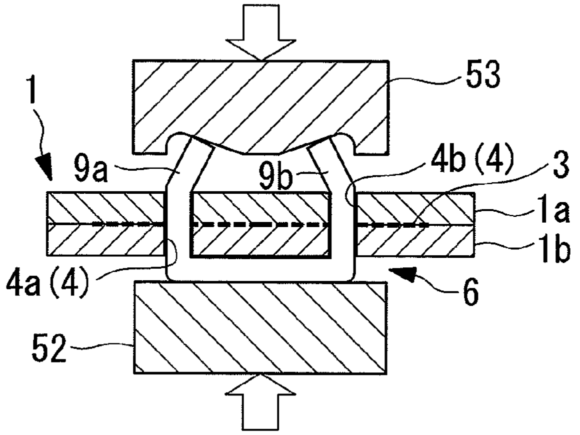
FIG. 1E is an explanation drawing illustrating the repairing method for the delamination generated between layers of the composite material.

The end portions 9*a*, 9*b* of the legs 8*a*, 8*b* inserted through the respective holes 4*a*, 4*b* are bent by pushing a staple clinching tool 53 downward from the top side and pushing the staple pushing tool 52 upward from the back side so that the staple 6 is held therebetween, as illustrated in FIG. 1E.

The bottom surface of the staple clinching tool 53 is recessed upward at a portion that comes in contact with the end portions 9*a*, 9*b* of the legs 8*a*, 8*b*. This recessed portion bends the end portions 9*a*, 9*b* of the legs 8*a*, 8*b* so that they oppose each other.

Figure 1F:
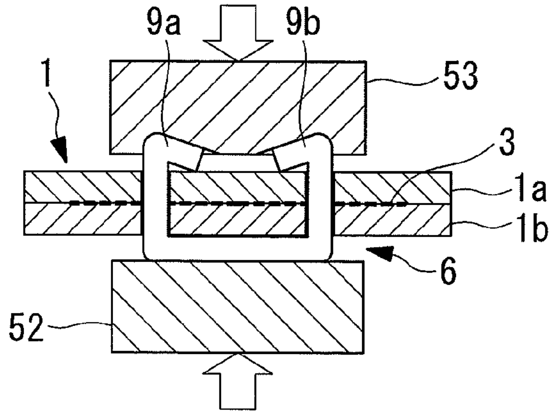
FIG. 1F is an explanation drawing illustrating the repairing method for the delamination generated between layers of the composite material.

Force is applied onto the end portions 9*a*, 9*b* from their top side by the staple clinching tool 53 and onto the staple 6 from its back side by the staple pushing tool 52, so as to bend the end portions 9*a*, 9*b* into a form of eyeglasses, as illustrated in FIG. 1F. Through this bending process, the staple 6 can join the delamination 3 generated between the layers 1*a*, 1*b* of the hardened composite material.

After the delamination 3 is joined with the staple 6, a sealing process is applied on the staple 6 in contact with the surface of the layers 1*a*, 1*b* of the composite material.

Figure 2A:
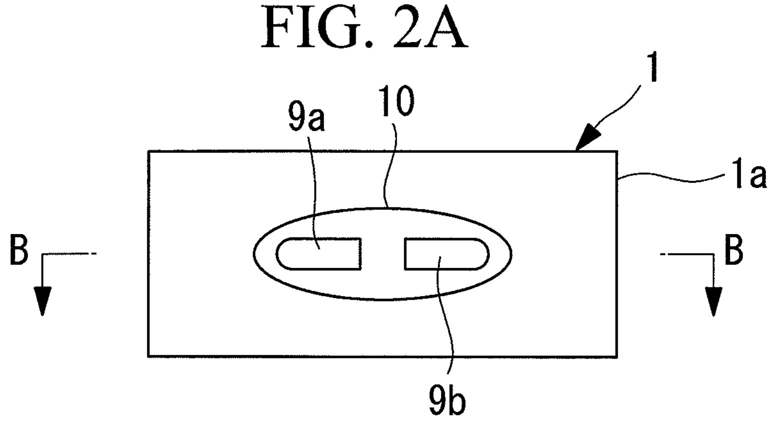
FIG. 2A is a top view for explaining a sealing process regarding the repairing method for composite material according to the first embodiment of the present invention.
Figure 2B:
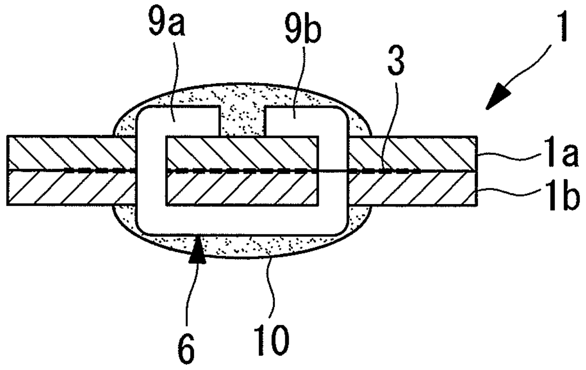
FIG. 2B is a cross sectional view taken along line B-B in FIG. 2A.
Figure 2C:
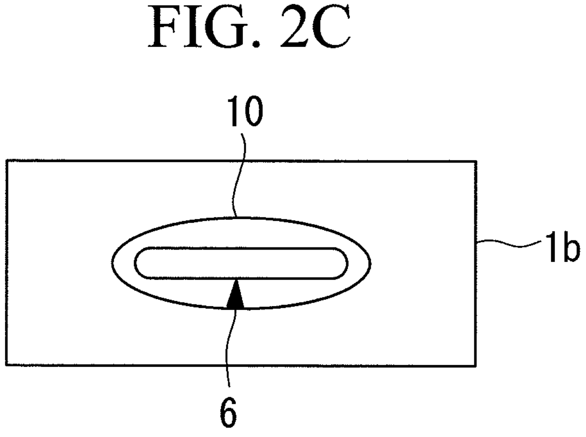
FIG. 2C is a bottom view of FIG. 2A.

FIGS. 2A to 2C illustrate the sealing process in the repairing method for composite material according to the present embodiment, FIG. 2A is a top view thereof, FIG. 2B is a cross sectional view taken along line B-B, and FIG. 2C is a bottom view thereof.

The sealing process is applied on the staple 6 to cover a part thereof in contact with the surface of the layer 1*b* of the composite material, and to cover on the end portions 9*a*, 9*b* of the staple 6 in contact with the surface of the layer 1*a* of the composite material, with sealing material (sealant) 10.

The sealing material 10 covers the staple 6 and the layer 1*b* of the composite material, and the end portions 9*a*, 9*b* of the staple 6 and the layer 1*a* of the composite material, thereby securing water tightness between the staple 6 and the layer 1*b* of the composite material and also between the end portions 9*a*, 9*b* of the staple 6 and the layer 1*a* of the composite material.

As described above, the repairing method for composite material and the repaired composite material using this method according to the present embodiment achieve the following advantageous effects.

The holes 4*a*, 4*b* are drilled through the delamination 3 generated between the layers 1*a*, 1*b* of the composite material, and the staple 6 (joining member) is inserted into the holes 4*a*, 4*b* so as to join the delamination 3. Accordingly, even the delamination 3 generated between the layers 1*a*, 1*b* of the hardened composite material can be readily joined. As a result, it is possible to reduce the time required for the repair to join the delamination 3 generated between the layers 1*a*, 1*b* of the hardened composite material.

The end portions 9*a*, 9*b* of the staple 6 inserted through the holes 4*a*, 4*b* are bent in the bending process. Accordingly, the staple 6 that joins the delamination 3 can be prevented from being loosened. As a result, it is possible to firmly join the delamination 3 generated between the layers 1*a*, 1*b* of the hardened composite material.

The end portions 9*a*, 9*b* of the staple 6 that are inserted through the holes 4*a*, 4*b* and exposed on the surface of the layer 1*a* of the composite material, and the portion of the staple 6 that is exposed on the surface of the layer 1*b* of the composite material are covered with the sealing material (sealant) 10. Accordingly, water can be prevented from intruding between the staple 6 and the layers 1*a*, 1*b* of the composite material. As a result, it is possible to readily and inexpensively prevent galvanic corrosion from being caused at the time of repairing to join the delamination 3 generated between the layers 1*a*, 1*b* of the hardened composite material.

The repairing method is employed, which is capable of readily repairing the delamination 3 generated between the layers 1*a*, 1*b* of the hardened composite material. Accordingly, it is possible to repair the composite material 1 readily in a short time even if it has been hardened.

Second Embodiment

Hereinafter, the second embodiment of the present invention will be explained. The repairing method for composite material and the composite material using this method according to the present embodiment are different from the first embodiment, where there are provided sleeves in the holes, and the others are the same. Thus, the same reference numerals refer to the same components and the same repairing method in the previously described embodiment, thus, descriptions thereof will be omitted.

FIGS. 3A to 3G are explanation drawings illustrating the repairing method for composite material according to the second embodiment of the present invention.

Figure 3A:
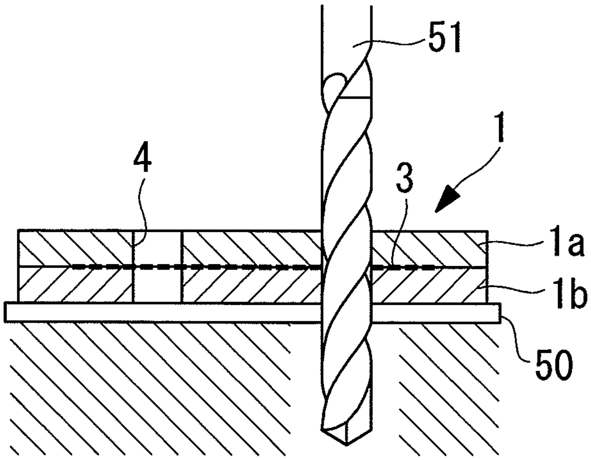
FIG. 3A is an explanation drawing illustrating the repairing method for composite material according to the second embodiment of the present invention, and is a cross sectional view of providing a drilling in the delaminated area generated between the layers of the composite material.
Figure 3B:
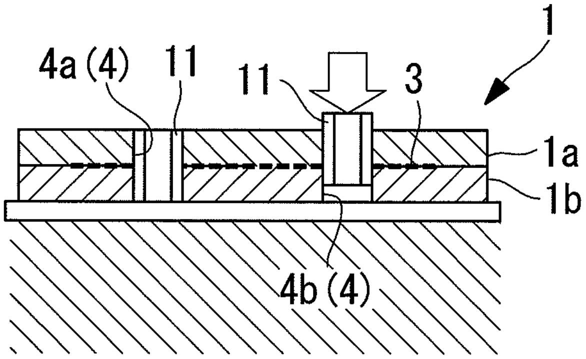
FIG. 3B is a cross sectional view illustrating that sleeves are inserted into the holes illustrated in FIG. 3A.
Figure 3C:
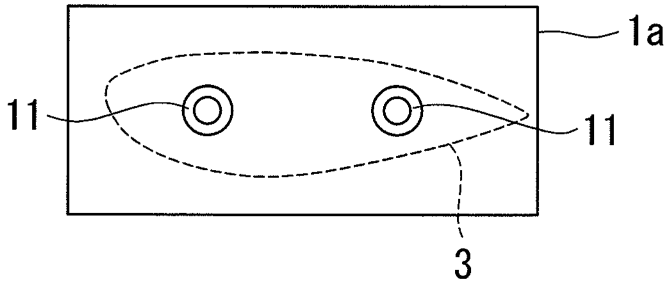
FIG. 3C is a top view of FIG. 3B.

FIG. 3A is a cross sectional view illustrating a drilling operation to form holes through the delamination generated between the layers of the composite material, FIG. 3B is a cross sectional view illustrating that sleeves are inserted in the holes, FIG. 3C is a top view of FIG. 3B, and FIG. 3A to FIG. 3G are explanation drawings illustrating the repairing method for the delamination generated between the layers of the composite material.

Each hole 4 is formed by use of the drill 51 having a diameter of 1.5 mm, for example, which is slightly greater than that of the first embodiment by the thickness of the sleeve 11, so as to penetrate the area of the delamination 3.

The sleeves 11 are inserted into the holes 4*a*, 4*b* formed through the layers 1*a*, 1*b* of the composite material, as illustrated in FIG. 3B.

Each sleeve 11 is a hollow cylinder having an outer diameter of 1.5 mm and an inner diameter of 0.9 mm, for example. The sleeves 11 have a length that is long enough to penetrate the holes 4*a*, 4*b*.

Figure 3D:
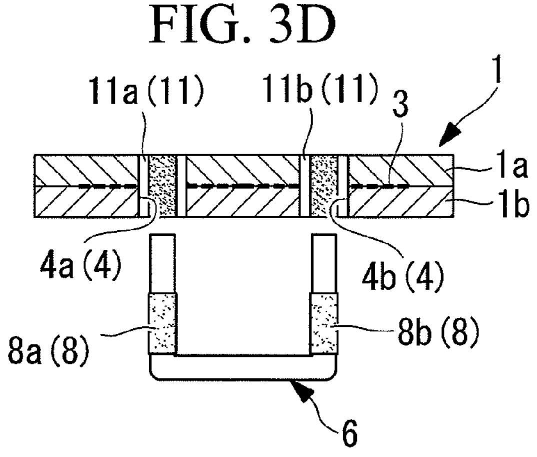
FIG. 3D is an explanation drawing illustrating the repairing method for the delamination generated between layers of the composite material.

As illustrated in FIG. 3D, adhesive is applied on the inner surfaces (inner wall) of the sleeves 11*a*, 11*b* respectively inserted into the holes 4*a*, 4*b*, and on the outer surfaces of the legs 8*a*, 8*b* of the staple 6.

Figure 3E:
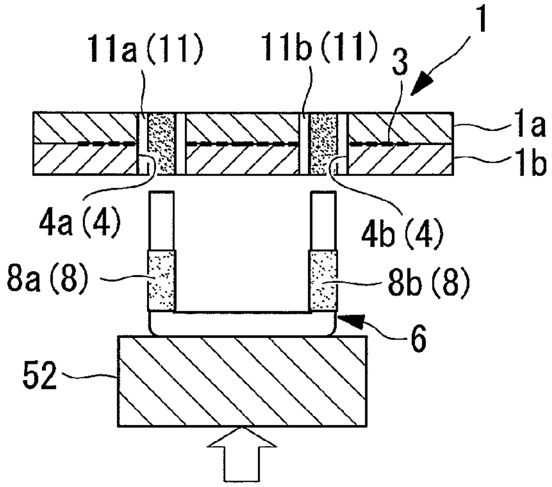
FIG. 3E is an explanation drawing illustrating the repairing method for the delamination generated between layers of the composite material.
Figure 3F:
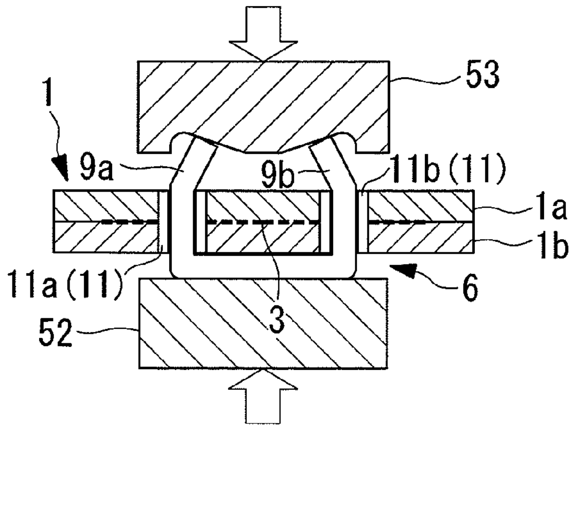
FIG. 3F is an explanation drawing illustrating the repairing method for the delamination generated between layers of the composite material.
Figure 3G:
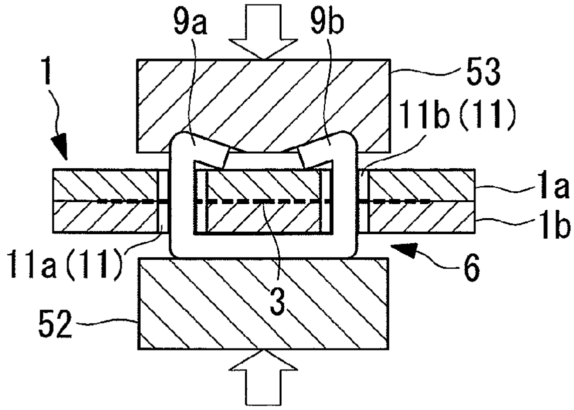
FIG. 3G is an explanation drawing illustrating the repairing method for the delamination generated between layers of the composite material.

As illustrated in FIG. 3E, the legs 8*a*, 8*b* of the staple 6 are inserted upward from the back side into the sleeves 11*a*, 11*b* on which adhesive is applied.

As described above, the repairing method for composite material and the composite material using this method according to the present embodiment achieve the following advantageous effects.

The sleeves 11*a*, 11*b* are inserted into the holes 4*a*, 4*b* formed through the delamination 3, and after this insertion of the sleeves 11*a*, 11*b*, the legs 8*a*, 8*b* of the staple (joining member) 6 are inserted through the sleeves 11*a*, 11*b*. Accordingly, the inner surface of the holes 4*a*, 4*b* can be prevented from being damaged, which may be caused if the legs 8*a*, 8*b* of the staple 6 are directly inserted through the holes 4*a*, 4*b*, and thereafter they are bent. As a result, it is possible to prevent a further delamination from progressing, as a result of damage caused on the holes 4*a*, 4*b*.

Further, it is possible to prevent galvanic corrosion from occurring in such a combination of materials that cause deterioration of the galvanic corrosion resistance when the staple 6 comes in contact directly with the composite material 1.

In the present embodiment, it has been explained that the sleeves 11*a*, 11*b* are inserted into the holes 4*a*, 4*b*, but the present invention is not limited to this. Protective plates may be provided between the staple 6 and the layer 1*b* of the composite material and between the end portions 9*a*, 9*b* of the staple 6 and the layer 1*a* of the composite material, respectively, in addition to the insertion of the sleeves 11*a*, 11*b* into the holes 4*a*, 4*b*.

Figure 4A:
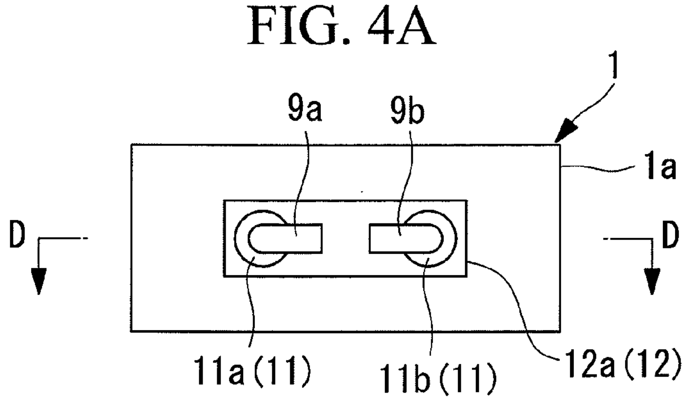
FIG. 4A is an explanation drawing of a modified example of the repairing method for composite material according to the second embodiment of the present invention, and is a top view illustrating that protective plates are held between the layers of the composite material and the staple.
Figure 4B:
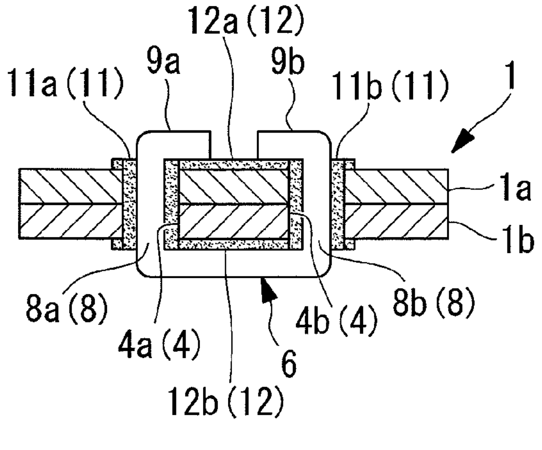
FIG. 4B is a cross sectional view taken along line D-D in FIG. 4A.

FIGS. 4A to 4B illustrate a modified example of the repairing method for composite material according to the second embodiment of the present invention. FIGS. 4A to 4B illustrate that the protective plates are held between the respective layers of the composite material and the staple, and FIG. 4A is a top view thereof, and FIG. 4B is a cross sectional view taken along line D-D in FIG. 4A.

The protective plate (galvanic corrosion resistance material) 12*a* is held between the surface of the layer 1*a* of the composite material and the end portions 9*a*, 9*b* of the staple 6. The protective plate (galvanic corrosion resistance material) 12*b* is also held between the surface of the layer 1*b* of the composite material and the staple 6. The protective plates 12*a*, 12*b* are made of galvanic corrosion resistance material. The protective plates 12*a*, 12*b* are provided with holes corresponding to the holes 4*a*, 4*b* formed through the layers 1*a*, 1*b* of the composite material.

The protective plates 12*a*, 12*b* are disposed on the surfaces of the respective layers 1*a*, 1*b* of the composite material after the sleeves 11*a*, 11*b* are inserted into the holes 4*a*, 4*b*. After the protective plates 12*a*, 12*b* are disposed on the surfaces of the layers 1*a*, 1*b* of the composite material, the legs 8*a*, 8*b* of the staple 6 are inserted through the protective plates 12*a*, 12*b*, and then through the holes 4*a*, 4*b*.

The above described modified example achieves the following advantageous effects.

The protective plates (galvanic corrosion resistance material) 12*a*, 12*b* are provided between the layers 1*a*, 1*b* of the hardened composite material and the staple (joining member) 6. Accordingly, galvanic corrosion can be prevented from occurring when the staple 6 comes in contact with the layers 1*a*, 1*b* of the composite material. As a result, it is possible to prevent the staple 6 from deteriorating, due to galvanic corrosion after the delamination (not shown) generated between the layers 1*a*, 1*b* of the hardened composite material is repaired.

Third Embodiment

Hereinafter, the third embodiment of the present invention will be explained. The repairing method for composite material and the composite material using this method according to the present embodiment are different from the first embodiment, where the end portions are crimped after they are bent, and the others are the same. Thus, the same reference numerals refer to the same components and the same repairing method in the previously described embodiments, and thus, descriptions thereof will be omitted.

Figure 5A:
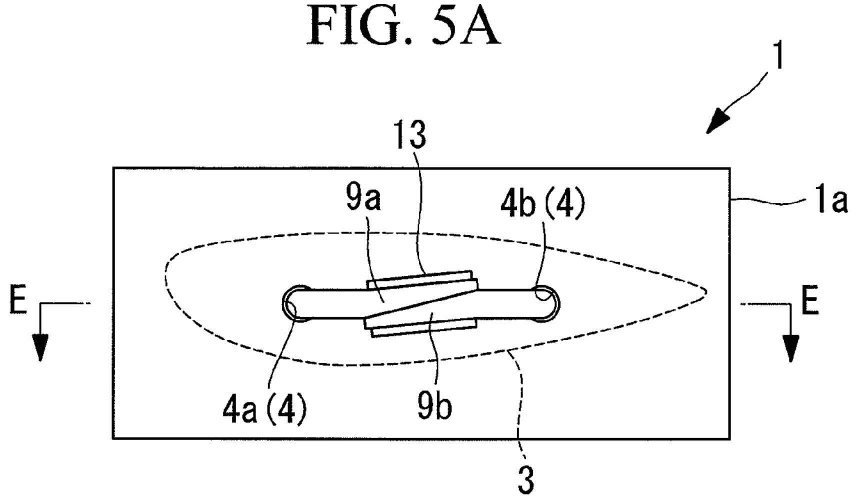
FIG. 5A is an explanation drawing illustrating the repairing method for composite material according to the third embodiment of the present invention, and is a top view illustrating that both the end portions of the staple are crimped with a crimping sleeve.
Figure 5B:
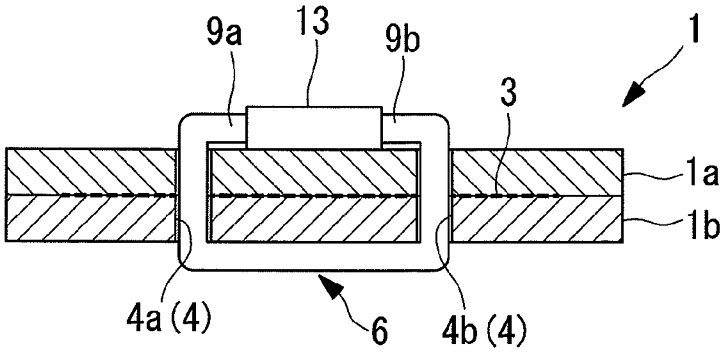
FIG. 5B is a cross sectional view taken along line E-E in FIG. 5A.
Figure 5C:
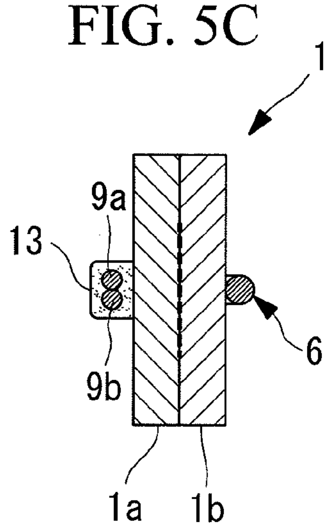
FIG. 5C is a side view of FIG. 5A.

FIGS. 5A to 5C are explanation drawings illustrating the repairing method for composite material according to the third embodiment of the present invention.

FIGS. 5A to 5C illustrate that both end portions of the staple are crimped with a crimping sleeve, FIG. 5A is a top view thereof, FIG. 5B is a cross sectional view taken along line E-E in FIG. 5A, and FIG. 5C is a side view thereof.

The end portions 9*a*, 9*b* of the staple 6 that are bent are inserted into the crimping sleeve (crimping member) 13 from the respective opposite sides. The crimping sleeve 13 is a hollow metal cylinder having an inner diameter great enough to pass the end portions 9*a*, 9*b* of the staple 6 therethrough. Force is applied onto the outer side of the crimping sleeve 13 in which the end portions 9*a*, 9*b* of the staple 6 are inserted.

By applying force onto the outer side of the crimping sleeve 13, the cross sectional shape of the crimping sleeve 13 is deformed into a quadrilateral shape, as illustrated in FIG. 5C. Therefore, the crimping sleeve 13 is squashed so that the end portions 9*a*, 9*b* of the staple 6 inserted in the crimping sleeve 13 are fixed thereinside.

As described above, the repairing method for composite material and the composite material using this method according to the present embodiment achieve the following advantageous effects.

The end portions 9*a*, 9*b* of the staple (joining member) 6 that are inserted through the holes 4*a*, 4*b* are crimped with the crimping sleeve (crimping member) 13. Accordingly, the staple 6 that joins the delamination 3 can be prevented from becoming loose, compared to the case without using the crimping sleeve 13. As a result, it is possible to more firmly join the delamination 3 generated between the layers 1*a*, 1*b* of the hardened composite material.

In the present embodiment, it has been explained that the end portions 9*a*, 9*b* of the staple 6 inserted through the holes 4*a*, 4*b* are inserted into the crimping sleeve 13 and are crimped thereinside, but the present invention is not limited to this, and a hook fitting for hooking the end portions 9*a*, 9*b* of the staple 6 may be used, instead of using the crimping sleeve 13.

FIGS. 6A to 6D are explanation drawings illustrating a first modified example of the repairing method for composite material according to the third embodiment of the present invention.

Figure 6A:
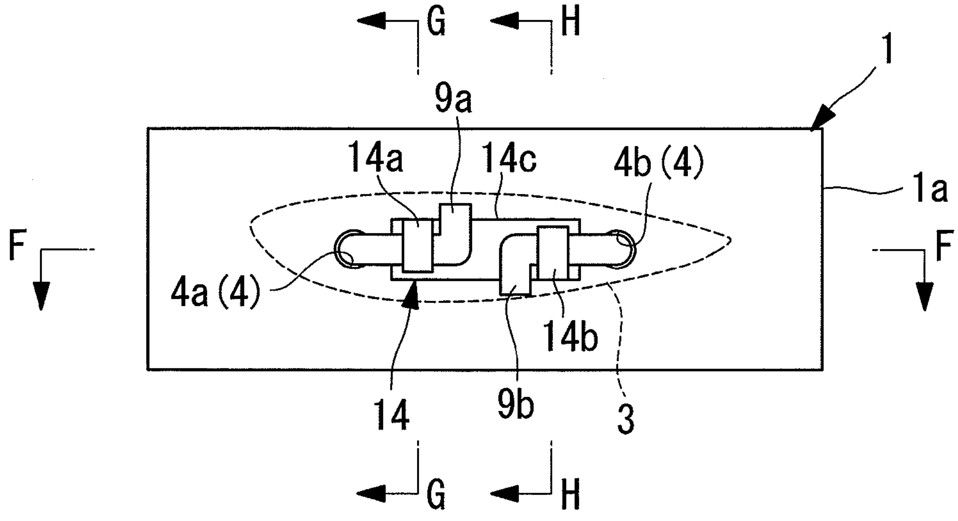
FIG. 6A is an explanation drawing illustrating a first modified example of the repairing method for composite material according to the third embodiment of the present invention, and is a top view illustrating that the end portions of the staple are hooked to the hook fitting.
Figure 6B:
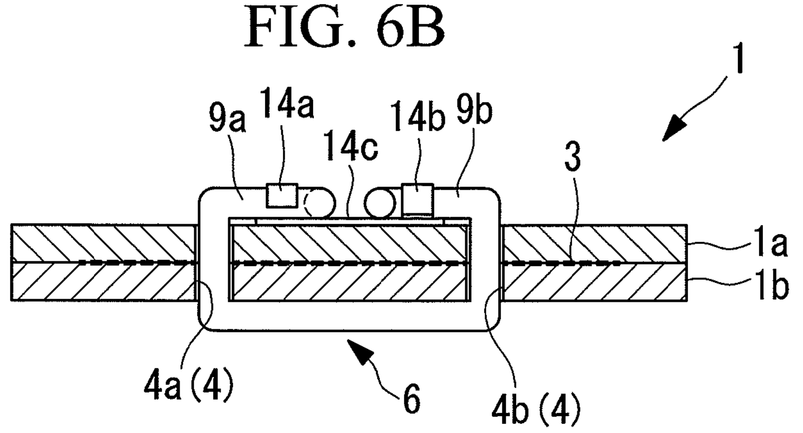
FIG. 6B is a cross sectional view taken along line F-F in FIG. 6A.
Figure 6C:
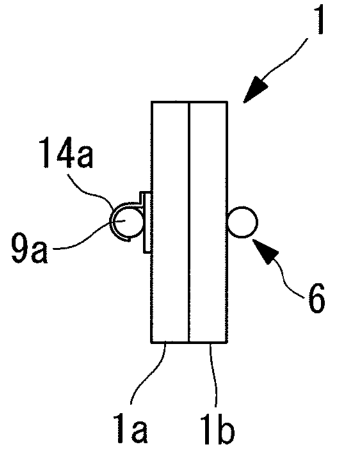
FIG. 6C is a cross sectional view taken along line G-G in FIG. 6A.
Figure 6D:
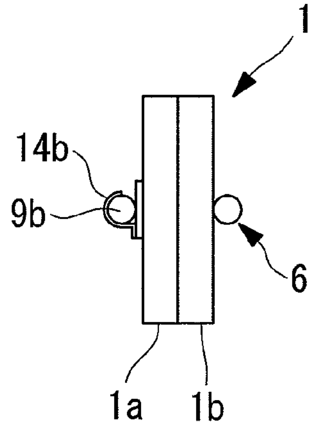
FIG. 6D is a cross sectional view taken along line H-H in FIG. 6A.

FIGS. 6A to 6D illustrate that the end portions of the staple are hooked to the hook fitting, FIG. 6A is a top view thereof, FIG. 6B is a cross sectional view taken along line F-F in FIG. 6A, FIG. 6C is a cross sectional view taken along line G-G in FIG. 6A, and FIG. 6D is a cross sectional view taken along line H-H in FIG. 6A.

The hook fitting (constraining member) 14 is stuck on the surface of the layer 1*a* of the hardened composite material. The end portions 9*a*, 9*b* of the staple (joining member) 6 that are bent are hooked to respective hook portions 14*a*, 14*b* of the hook fitting 14.

The end portions 9*a*, 9*b* hooked to the respective hook portions 14*a*, 14*b* are bent to opposite sides relative to respective free ends (described later) of the hook portions 14*a*, 14*b*. Specifically, the end portion 9*a* passing through the hook portion 14*a* is bent toward the upper side of the drawing surface, and the end portion 9*b* passing through the hook portion 14*b* is bent toward the lower side of the drawing surface, as illustrated in FIG. 6A.

The hook fitting 14 includes a couple of the hook portions 14*a*, 14*b* and a hook fitting base 14*c*. The hook fitting base 14*c* has a rectangular shape. The hook fitting base 14*c* is disposed in the longitudinal direction of the delamination 3.

The couple of the hook portions 14*a*, 14*b* are provided on the top surface of the hook fitting base 14*c*. The hook portions 14*a*, 14*b* are disposed vertically relative to the longitudinal direction of the hook fitting base 14*c*. One end of each of the hook portions 14*a*, 14*b* is fixed to the hook fitting base 14*c*, and the other end thereof is a free end, as illustrated in FIG. 6C and FIG. 6D. The free ends of the couple of the hook portions 14*a*, 14*b* are so disposed as to be oriented in the opposite direction from each other.

In the present embodiment, the end portions of the staple may simply be crimped without being bent.

Figure 7A:
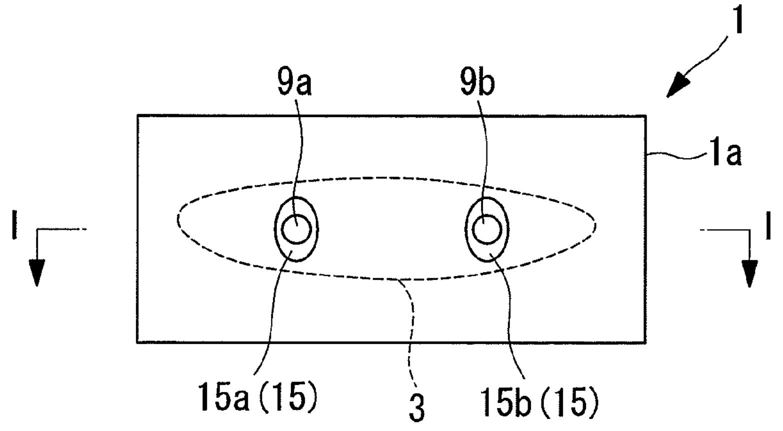
FIG. 7A is an explanation drawing illustrating a second modified example of the repairing method for composite material according to the third embodiment of the present invention, and is a top view illustrating that the end portions of the staple are crimped without being bent by means of a crimping sleeve.
Figure 7B:
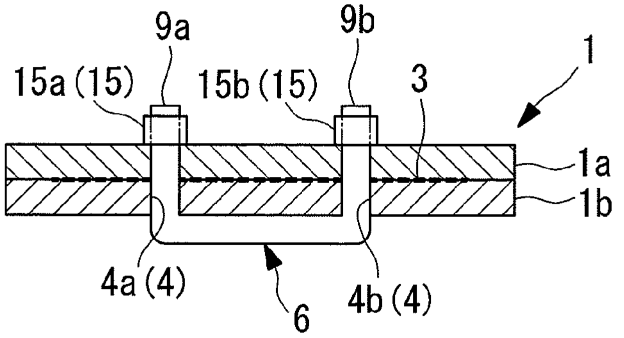
FIG. 7B is a cross sectional view taken along line I-I in FIG. 7A.

FIGS. 7A and 7B are explanation drawings illustrating a second modified example of the repairing method for composite material according to the third embodiment of the present invention.

FIGS. 7A and 7B illustrate that the end portions of the staple are crimped without being bent by means of the crimping sleeve, and FIG. 7A is a top view thereof, and FIG. 7B is a cross sectional view taken along line I-I in FIG. 7A.

The crimping sleeves (crimping member) 15 are provided at the respective end portions 9*a*, 9*b* of the staple 6 inserted through the respective holes 4*a*, 4*b* without being bent. Each of the crimping sleeves 15*a*, 15*b* is a metal cylinder. Force is applied onto the outer side of each of the crimping sleeves 15*a*, 15*b* so as to crimp the end portions 9*a*, 9*b*.

In the present embodiment, it has been explained that the joining member is the staple 6 having a U-letter outer shape, but this may be liner pins that are inserted through the holes 4*a*, 4*b*, and both ends of each linear pin may be crimped.

Figure 8A:
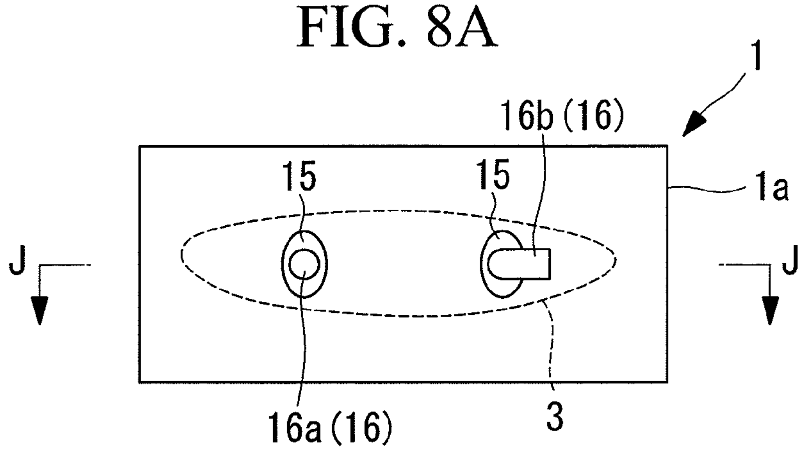
FIG. 8A is an explanation drawing illustrating a third modified example of the repairing method for composite material according to the third embodiment of the present invention, and is a top view of a left section of FIG. 8A illustrating that both the ends of the pin inserted through the hole are crimped without being bent, and a right section of FIG. 8A thereof illustrating that both the ends of the pin inserted through the hole are bent after they are crimped.
Figure 8B:
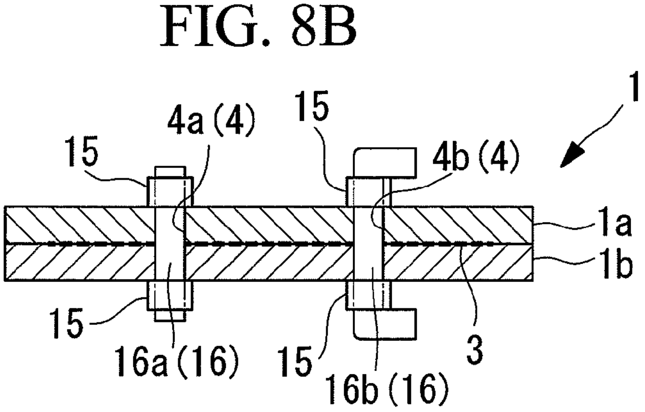
FIG. 8B is a cross sectional view taken along line J-J in FIG. 8A.
Figure 8C:
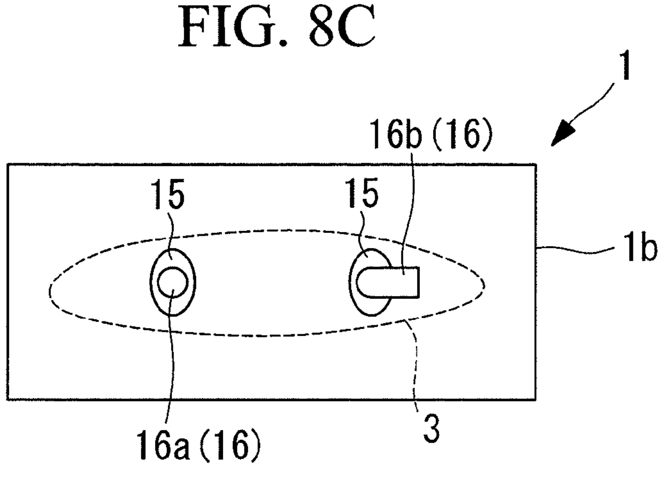
FIG. 8C is a bottom view of FIG. 8A.

FIGS. 8A to 8C are explanation drawings illustrating a third modified example of the repairing method for composite material according to the third embodiment of the present invention.

Each left section of FIGS. 8A to 8C illustrates that both of the ends of the pin through the hole are crimped without being bent, each right section of FIG. 8 illustrates that both ends of the pin through the hole are bent after they are crimped, FIG. 8A is a top view thereof, FIG. 8B is a cross sectional view taken along line J-J in FIG. 8A, and FIG. 8C is a bottom view thereof.

The respective liner pins (joining member) 16 are inserted through the respective holes 4*a*, 4*b*. As shown in the left section of FIG. 8A, each end portion of the pin 16*a* inserted through the hole 4*a* is provided with the crimping sleeve (crimping member) 15. As shown in the right section of FIG. 8A, each end portion of the pin 16*b* inserted through the hole 4*b* is provided with the crimping sleeve 15, and each end portion of the pin 16*b* inserted through the crimping sleeve 15 is bent.

Fourth Embodiment

Hereinafter, the fourth embodiment of the present invention will be explained. The repairing method for composite material and the composite material using this method according to the present embodiment are different from the first embodiment, where each leg of the staple has a quadrilateral cross sectional shape, and the others are the same. Thus, the same reference numerals refer to the same components and the same repairing method in previously described embodiments, and thus, descriptions thereof will be omitted.

Figure 9A:
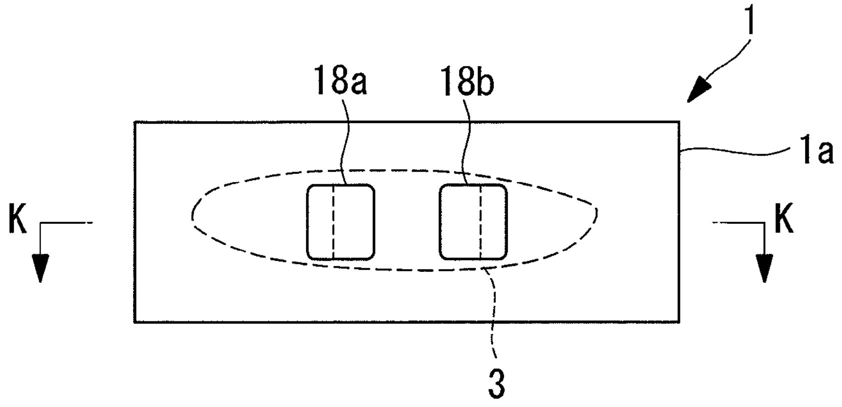
FIG. 9A is an explanation drawing illustrating the repairing method for composite material according to the fourth embodiment of the present invention, and is a top view illustrating that the joining is carried out by use of the staple having legs each of which has a quadrilateral cross sectional shape as the joining member.
Figure 9B:
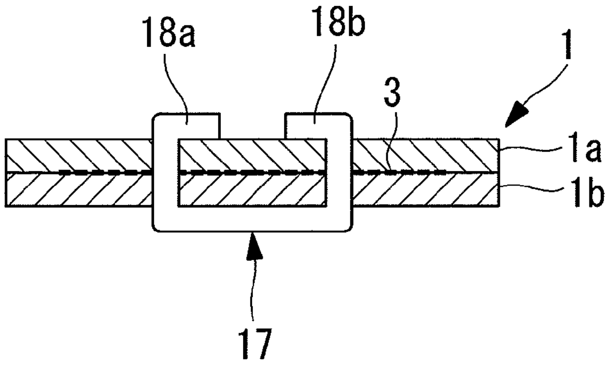
FIG. 9B is a cross sectional view taken along line K-K in FIG. 9A.

FIGS. 9A and 9B are explanation drawings illustrating the repairing method for composite material according to the fourth embodiment of the present invention.

FIGS. 9A and 9B illustrate that the joining is carried out by use of the staple having legs each of which has a quadrilateral cross sectional shape as the joining member, FIG. 9A is a top view thereof, and FIG. 9B is a cross sectional view taken along line K-K in FIG. 9A.

Each of the legs 18a, 18b of the staple 17 has a quadrilateral cross sectional shape vertical to the axial direction thereof.

As described above, the repairing method for composite material and the composite material using this method according to the present embodiment achieve the following advantageous effects.

The delamination 3 is joined by use of the staple (joining member) 17 having the legs 18a, 18b each of which has a quadrilateral cross sectional shape vertical to the axial direction thereof. Accordingly, strength to join the delamination 3 can be enhanced. As a result, it is possible to more firmly join the delamination 3 generated between the layers 1a, 1b of the hardened composite material.

Fifth Embodiment

Hereinafter, the fifth embodiment of the present invention will be explained. The repairing method for composite material and the composite material using this method according to the present embodiment are different from the first embodiment, where the staple has many legs and each leg thereof has a quadrilateral cross sectional shape, but the others are the same. Thus, the same reference numerals refer to the same components and the same repairing method in previously described embodiment, and thus, descriptions thereof will be omitted.

FIGS. 10A to 10D are explanation drawings illustrating the repairing method for composite material according to the fifth embodiment of the present invention.

Figure 10A:
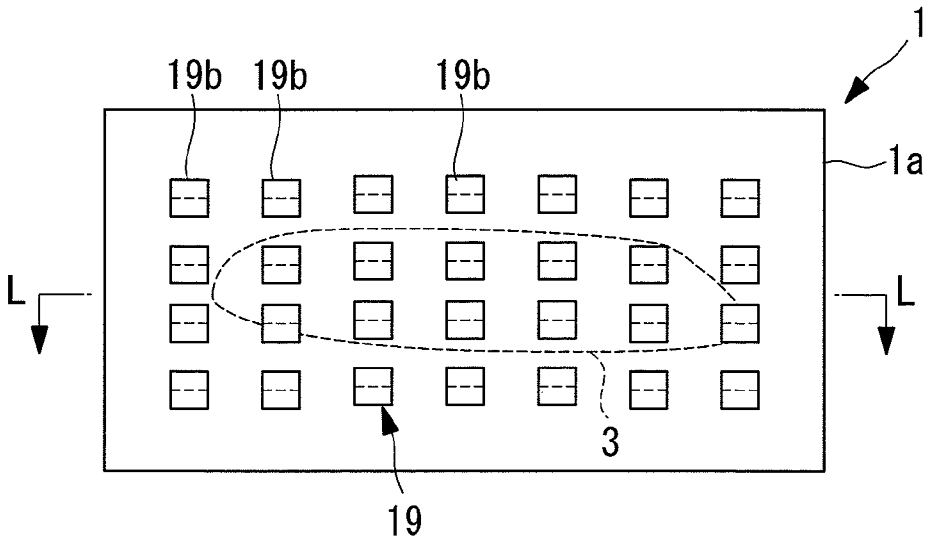
FIG. 10A is an explanation drawing illustrating the repairing method for composite material according to the fifth embodiment of the present invention, and is a top view illustrating that the joining is carried out by use of the staple having many legs each of which has a quadrilateral cross sectional shape.
Figure 10B:
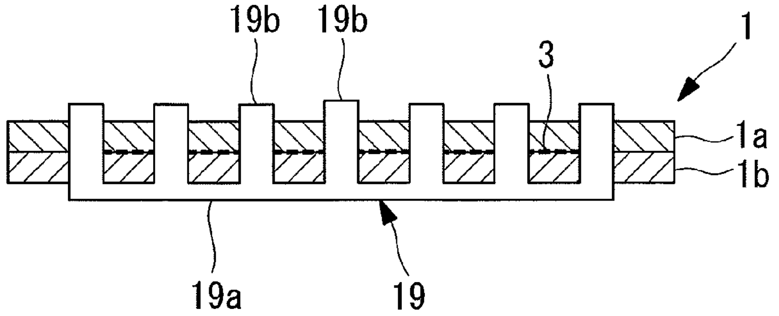
FIG. 10B is a cross sectional view taken along line L-L in FIG. 10A.
Figure 10C:
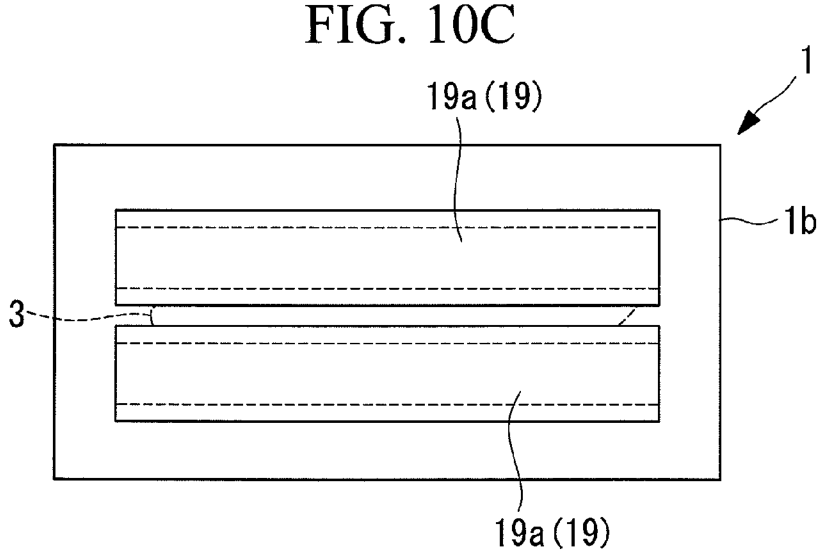
FIG. 10C is a bottom view of FIG. 10A.
Figure 10D:
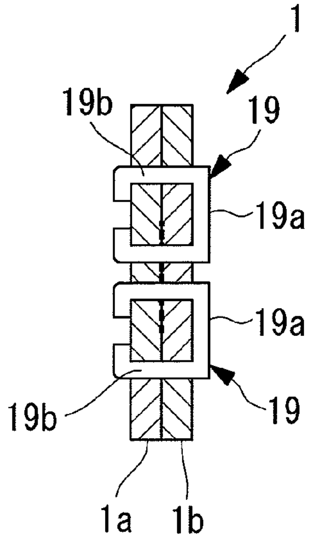
FIG. 10D is a side view of FIG. 10A.

FIGS. 10A to 10D illustrate that the joining is carried out by use of the staple having many legs each of which has a quadrilateral cross sectional shape, FIG. 10A is a top view thereof, FIG. 10B is a cross sectional view taken along line L-L in FIG. 10A, FIG. 10C is a bottom view thereof, and FIG. 10D is a side view thereof.

Plural (for example, two) staples (joining member) 19 are provided. Each staple 19 is disposed with its longitudinal direction along the longitudinal direction of the delamination 3. The two staples 19 are so disposed as to be parallel to each other.

Each staple 19 includes a staple base 19a and plural (for example, fourteen) legs 19b. Each staple base 19a has a rectangular shape long enough to cover the longitudinal direction of the delamination 3. Each staple base 19a is provided with the legs 19b in two rows, in each row the legs 19b are aligned at an equal interval in between in the longitudinal direction thereof. Each staple base 19a has seven legs 19b in each row, for example. Each leg 19b has a quadrilateral cross sectional shape vertical to its axial direction.

As described above, the repairing method for composite material and the composite material using this method according to the present embodiment achieve the following advantageous effects.

The delamination 3 is joined by use of the staple (joining member) 19 having fourteen (plural) legs 19b. Accordingly, it is possible to more firmly join the delamination 3 generated between the layers 1a, 1b of the hardened composite material.

Since the staple base 19a becomes firm, its redundancy can be enhanced, compared to the case in which the staples 19 are disposed randomly.

If the staple pushing member (not illustrated) and the staple clinching member (not illustrated) are provided dedicated to the staple 19, the attachment of the staple 19 can be done at a time, thereby to reduce the operation time.

The staple base 19a may have a hollow interior. Accordingly, it is possible to reduce the weight of the staple 19.

Sixth Embodiment

Hereinafter, the sixth embodiment of the present invention will be explained. The repairing method for composite material and the composite material using this method according to the present embodiment are different from the first embodiment, where each of four legs of the staple has a quadrilateral cross sectional shape and the staple has one leg on each side thereof, but the others are the same. Thus, the same reference numerals refer to the same components and the same repairing method in the previously described embodiment, and thus, descriptions thereof will be omitted.

Figure 11A:
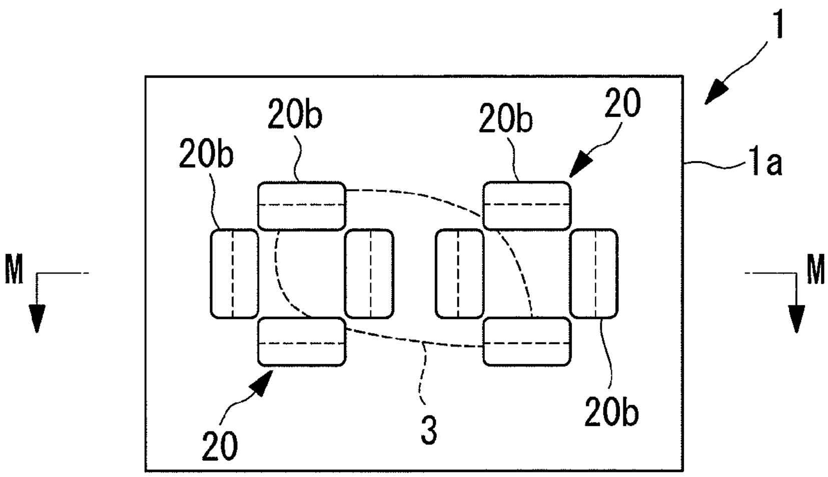
FIG. 11A an explanation drawing illustrating the repairing method for composite material according to the sixth embodiment of the present invention, and is a top view illustrating that the joining is carried out by use of the staple having four legs each of which has a quadrilateral cross sectional shape and is provided on each side of the staple.
Figure 11B:
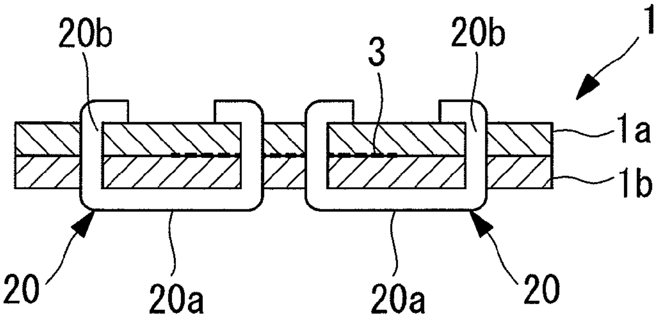
FIG. 11B is a cross sectional view taken along line M-M in FIG. 11A.
Figure 11C:
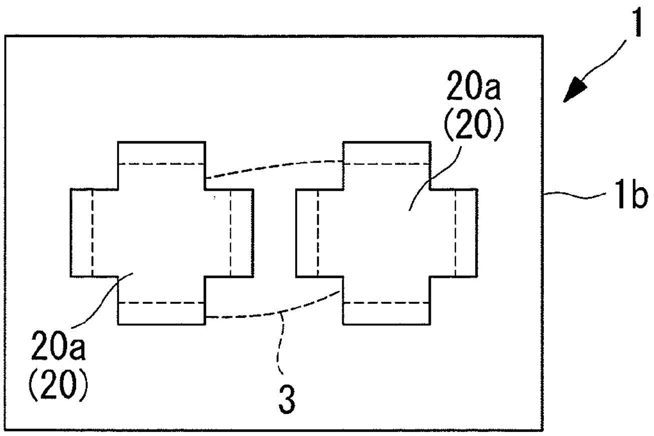
FIG. 11C is a bottom view of FIG. 11A.

FIGS. 11A to 11C are explanation drawings illustrating the repairing method for composite material according to the sixth embodiment of the present invention.

FIGS. 11A to 11C illustrate that the joining is carried out by use of the staple having four legs each of which has a quadrilateral cross sectional shape and is provided on each side of the staple, FIG. 11A is a top view thereof, FIG. 11B is a cross sectional view taken along line M-M in FIG. 11A, and FIG. 11C is a bottom view thereof.

For example, a couple of the staples (joining member) 20 may be provided. Each staple 20 is disposed adjacent to each other. Each staple 20 has a size large enough to cover the delamination 3 with the couple of the staples 20 disposed adjacent to each other.

The staple 20 includes the staple base 20a and four legs 20b. The staple base 20a has a square shape in the bottom view, as illustrated in FIG. 11C. Each leg 20b is provided on each side of the staple base 20a. Each leg 20b has a rectangular (quadrilateral) cross sectional shape vertical to the axial direction thereof. Each opposite leg 20b is so bent as to oppose each other, thereby joining the delamination 3.

As described above, the repairing method for composite material and the composite material using this method according to the present embodiment achieve the following advantageous effects.

The staple 20 is configured such that each of the four legs 20b having a rectangular (quadrilateral) cross sectional shape vertical to the axial direction thereof is provided on each side of the staple base 20a, and such configured staple 20 is used as the joining member. Accordingly, the delamination 3 generated between the layers 1a, 1b of the hardened composite material can be bonded more firmly since the joining of the delamination 3 is held by the legs 20b in two directions vertical to each other at a time.

Seventh Embodiment

Hereinafter, the seventh embodiment of the present invention will be explained. The repairing method for composite material and the composite material using this method according to the present embodiment are different from the first embodiment, where blind rivets are used instead of using the staples, but the others are the same. Thus, the same reference numerals refer to the same components and the same repairing method in the previously described embodiment, and thus, descriptions thereof will be omitted.

Figure 12A:
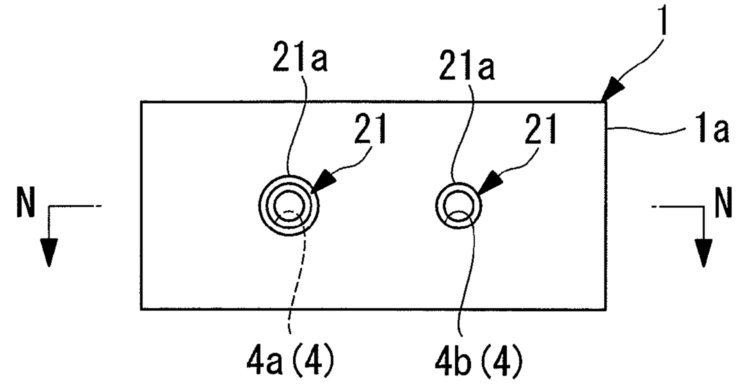
FIG. 12A is an explanation drawing illustrating the repairing method for composite material according to the seventh embodiment of the present invention, and is a top view of a right section of FIG. 12A illustrating that the blind rivet inserted through a hole, and a left section of FIG. 12A thereof illustrating that the joining is carried out by use of the blind rivet.
Figure 12B:
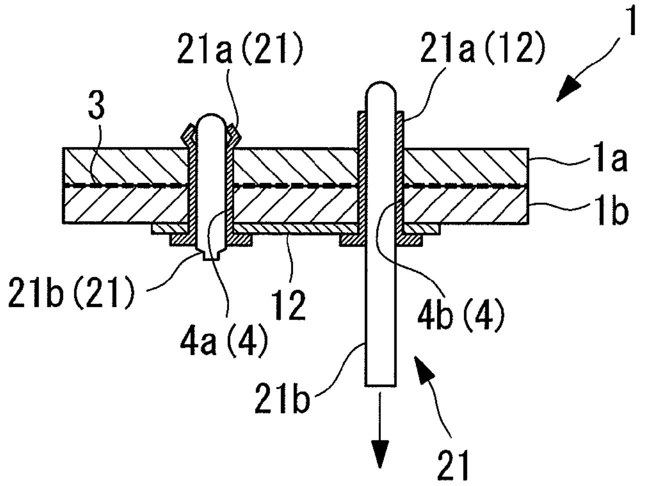
FIG. 12B is a cross sectional view taken along line N-N in FIG. 12A.
Figure 12C:
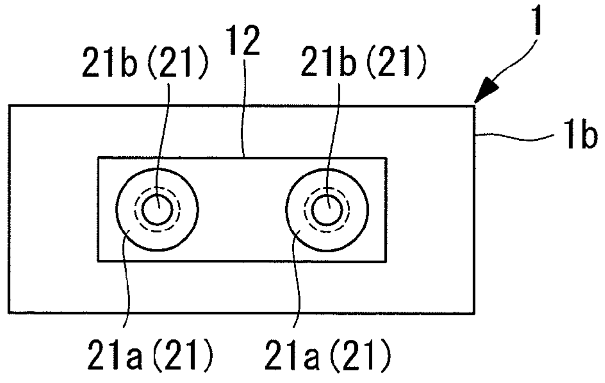
FIG. 12C is a bottom view of FIG. 12A.

FIGS. 12A to 12C are explanation drawings illustrating the repairing method for composite material according to the seventh embodiment of the present invention.

Each right section of FIGS. 12A to 12C illustrates that the blind rivet is inserted through a hole, each left section of FIG. 12 illustrates that the joining is carried out by use of the blind rivet, FIG. 12A is a top view thereof, FIG. 12B is a cross sectional view taken along line N-N in FIG. 12A, and FIG. 12C is a bottom view thereof.

After the holes 4*a*, 4*b* are provided, a protective member (galvanic corrosion resistance material) 12 is provided on the surface of the layer 1*b* of the composite material. The blind rivets (joining member) 21 are inserted through the respective holes 4*a*, 4*b* with the protective member 12 held between the blind rivets 21 and the layer 1*b* by use of a riveter (not illustrated). By handling the riveter, a sleeve with a flange 21*a* of the blind rivet 21, described later, is deformed and a mandrel 21*b* is cut off at the middle thereof. Accordingly, the delamination 3 generated between the layers 1*a*, 1*b* of the hardened composite material is joined with the blind rivets 21.

Each blind rivet 21 includes the sleeve with the flange 21*a* and the mandrel 21*b* inserted through the sleeve with the flange 21*a*. The blind rivet 21 is inserted through the hole 4*b* in such a manner that the sleeve with the flange 21*a* comes in contact at its flange portion with the protective member 12 by handling the riveter, as illustrated in the right section of FIG. 12B.

Each of the blind rivets 21 inserted through the respective holes 4*a*, 4*b* is deformed at the tip end of the sleeve with the flange 21*a* on the surface of the layer 1*a* of the composite material by handling the riveter so as to pull back the mandrel 21*b*, as illustrated in the left section of FIG. 12B. After the sleeve with the flange 21*a* is bulbed at its tip end and is fixed to the surface of the layer 1*a* of the composite material, the mandrel 21*b* is cut off in the vicinity of the flange of the sleeve with the flange 21*a* (in the vicinity of the surface of the layer 1*b* of the composite material). Thus, the crimping operation with the blind rivets 21 is completed.

As described above, the repairing method for composite material and the composite material using this method according to the present embodiment achieve the following advantageous effects.

The blind rivets 21 are used as the joining member. Thus, the blind rivets 21 can be inserted through the holes 4*a*, 4*b*, and can also be crimped. Accordingly, the delamination 3 can be readily joined, compared to the case of using the staple (not illustrated). As a result, it is possible to reduce the repairing time for the delamination 3 generated between the layers 1*a*, 1*b* of the hardened composite material.

Eighth Embodiment

Hereinafter, the eighth embodiment of the present invention will be explained. The repairing method for composite material and the composite material using this method according to the present embodiment is different from the first embodiment, where the surface of the staple is coated, but the others are the same. Thus, the same reference numerals refer to the same components and the same repairing method in the previously described embodiment, and thus, descriptions thereof will be omitted.

Figure 13A:
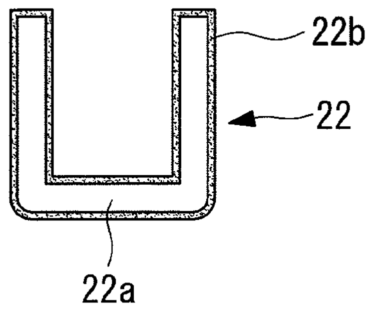
FIG. 13A is an explanation drawing illustrating the repairing method for composite material according to the eighth embodiment of the present invention, and is a longitudinal sectional view illustrating the staple whose surface is coated with coating material.
Figure 13B:
FIG. 13B is a cross sectional view of the legs of the staple illustrated in FIG. 13A.

FIGS. 13A and 13B are explanation drawings illustrating the repairing method for composite material according to the eighth embodiment of the present invention.

FIGS. 13A and 13B illustrate the staple whose surface is coated with coating material, FIG. 13A is a longitudinal sectional view thereof, and FIG. 13B is a cross sectional view of the legs of the staple.

The staple (joining member) 22 includes a core 22*a* made of material that is excellent in strength characteristics and capable of being cold-worked, and coating material (surface coating) 22*b* with which the surface of the core 22*a* is coated. The surface of the core 22*a* is coated with the coating material 22*b* for galvanic corrosion prevention.

As described above, the repairing method for composite material and the composite material using this method according to the present embodiment achieve the following advantageous effects.

The staple (joining member) 22 coated with the coating material (surface coating) 22*b* for galvanic corrosion prevention is used. Accordingly, occurrence of the galvanic corrosion can be prevented without providing sleeves (not illustrated). As a result, it is possible to reduce the repairing time for the delamination (not illustrated) generated between the layers of the hardened composite material (not illustrated), and prevent the staple 22 from deteriorating due to the galvanic corrosion after the repairing.

Further, since no sleeves are provided, it is possible to reduce the diameters of the holes (not illustrated) drilled in the composite material (not illustrated). Accordingly, it is possible to facilitate the drilling operation, and reduce the influence of deterioration of strength due to fiber fracture of the composite material.

In the present embodiment, it has been explained that the coating material 22*b* is coated for the sake of preventing galvanic corrosion, but the present invention is not limited to this, and the coating material 22*b* may be a material for use in conductive processing or insulation processing.

Ninth Embodiment

Hereinafter, the ninth embodiment of the present invention will be explained. The repairing method for composite material and the composite material using this method according to the present embodiment are different from the first embodiment, where the staple is made of shape memory alloy, but the others are the same. Thus, same numbers refer to same components and same repairing method in the previously described embodiment, thus, descriptions thereof will be omitted.

Figure 14A:
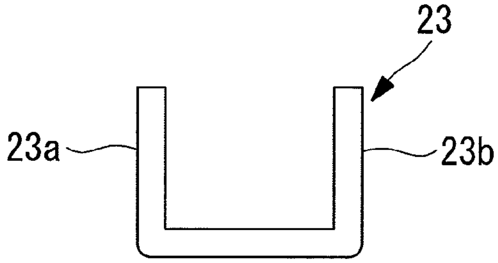
FIG. 14A is an explanation drawing illustrating the repairing method for composite material according to the ninth embodiment of the present invention, and is a longitudinal sectional view illustrating a state of the staple made of shape memory alloy at a predetermined temperature or below.
Figure 14B:
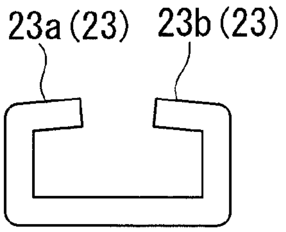
FIG. 14B is a longitudinal sectional view illustrating a state of the staple illustrated in FIG. 14A at a predetermined temperature or above.

FIGS. 14A and 14B are explanation drawings illustrating the repairing method for composite material according to the ninth embodiment of the present invention.

FIGS. 14A and 14B illustrate the staple made of shape memory alloy, FIG. 14A illustrates a state of the staple at a predetermined temperature or below, and FIG. 14B illustrates a state of the staple at a predetermined temperature or above.

The staple (joining member) 23 is made of shape memory alloy. The shape memory alloy may include titanium nickel alloy, for example. The staple 23 has end portions 23*a*, 23*b* both of which linearly extend upward at a predetermined temperature or below, as illustrated in FIG. 14A. On the other hand, the staple 23 is heat-treated so that both end portions 23*a*, 23*b* thereof become bent toward each other at a predetermined temperature or above, as illustrated in FIG. 14B.

Figure 15:
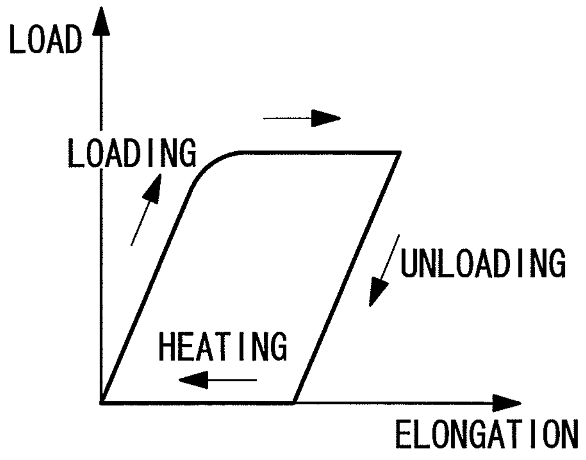
FIG. 15 is a load-elongation diagram of the shape memory alloy.

FIG. 15 is a load-elongation diagram of the shape memory alloy. The horizontal axis shows elongation and the vertical axis shows load in FIG. 15.

Figure 16:
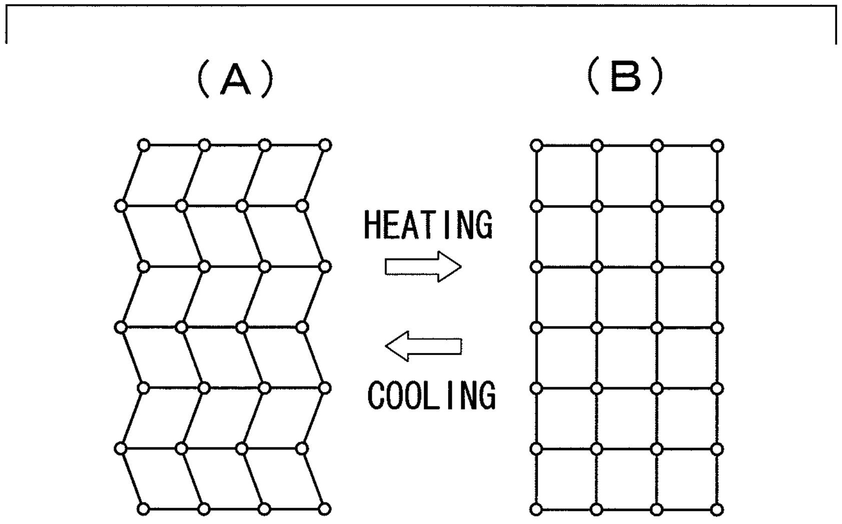
FIG. 16 is a schematic drawing of atoms of shape memory alloy.

FIGS. 16A and 16B are schematic drawings of atoms of the shape memory alloy, and FIG. 16(A) illustrates a state thereof at a lower temperature, and FIG. 16(B) illustrates a state thereof at a higher temperature.

When the staple 23 (see FIG. 14) made of the shape memory alloy deforms the end portions 23*a*, 23*b* thereof to linearly extend upward at a predetermined temperature or below, distortion occurs in the bond between atoms as illustrated in FIG. 16(A). If the staple 23 in the above state is heated to a predetermined temperature or above, each atom included in the staple 23 returns to a memorized state, as illustrated in FIG. 16(B). Thus, the end portions 23*a*, 23*b* of the staple 23 come into a state in which they are bent.

As described above, the repairing method for composite material and the composite material using this method according to the present embodiment achieve the following advantageous effects.

Shape memory alloy is used as material for the staple (joining member) 23. Accordingly, the staple 23 can be formed into a predetermined shape depending on the temperature change. As a result, it is possible to readily in a short time carry out the repairing to bond the delamination between the layers of the hardened composite material (not illustrated) by inserting the staple 23 through the holes (not illustrated) and heating the staple to a predetermined temperature.

Tenth Embodiment

Hereinafter, the tenth embodiment of the present invention will be explained. The repairing method for composite material and the composite material using this method according to the present embodiment are different from the first embodiment, where the staple is made of composite fiber impregnated with resin, but the others are the same. Thus, the same reference numerals refer to the same components and the same repairing method in the previously described embodiment, and thus, descriptions thereof will be omitted.

FIGS. 17A to 17D are explanation drawings illustrating the repairing method for composite material according to the tenth embodiment of the present invention.

Figure 17A:
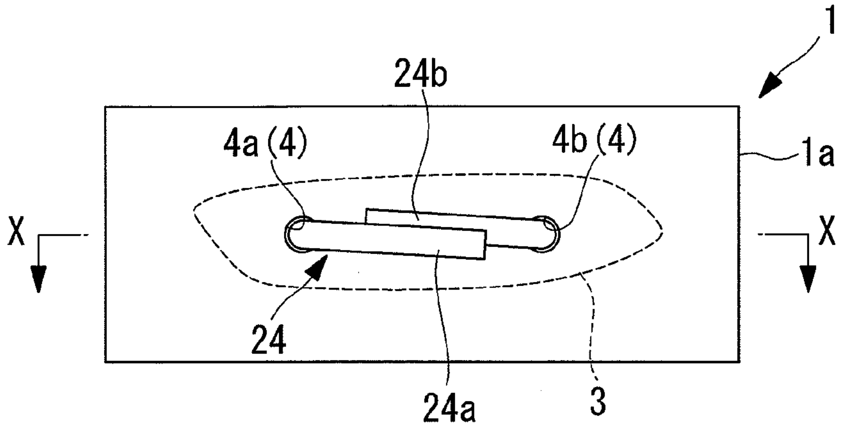
FIG. 17A is an explanation drawing illustrating the repairing method for composite material according to the tenth embodiment of the present invention, and is a top view illustrating that the end portions of the staple made of the reinforced fiber are cured to each other.
Figure 17B:
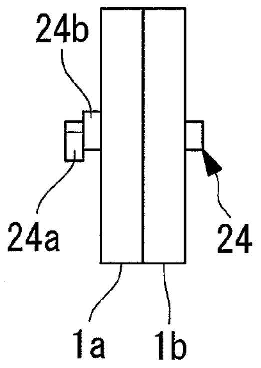
FIG. 17B is a side view of FIG. 17A.
Figure 17C:
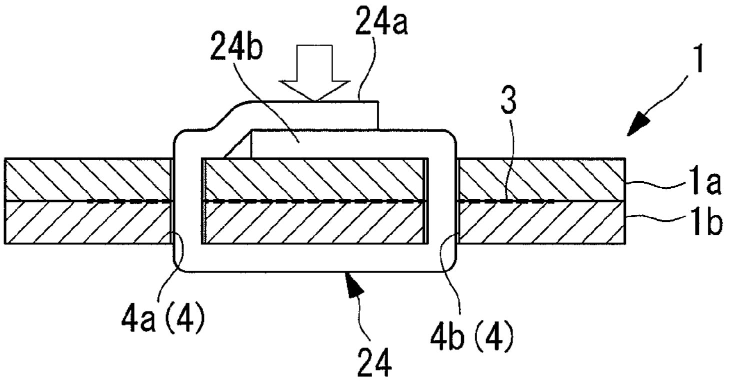
FIG. 17C is a cross sectional view taken along line X-X in FIG. 17A.
Figure 17D:
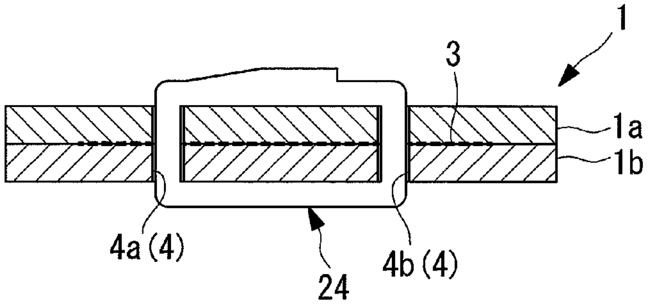
FIG. 17D illustrates that the end portions of the staple illustrated in FIG. 17C are joined to each other.

FIGS. 17A to 17D illustrate that the end portions of the staple made of the reinforced fiber are cured to each other, FIG. 17A is a top view thereof, FIG. 17B is a side view thereof, FIG. 17C is a cross sectional view taken along line X-X in FIG. 17A, and FIG. 17D illustrates that the end portions of the staple illustrated in FIG. 17C are joined to each other.

The staple (joining member) 24 is made of, for example, the reinforced fiber impregnated with resin such as thermoplastics resin. The end portions 24*a*, 24*b* of the staple 24 inserted through the holes 4*a*, 4*b* are pressed downward from the top to each other as illustrated in FIG. 17C. Thereafter, the staple 24 is maintained so that the end portions 24*a*, 24*b* thereof are encouraged to be cured, and then are completely hardened and joined to each other, as illustrated in FIG. 17D.

As described above, the repairing method for composite material and the composite material using this method according to the present embodiment achieve the following advantageous effects.

Reinforced fiber impregnated with thermoplastics resin is used for the staple (joining member) 24. Thus, this reinforced fiber impregnated with thermoplastics resin can be cured and joined at room temperature. Accordingly, it is possible to more firmly bond the delamination 3 generated between the layers 1*a*, 1*b* of the hardened composite material.

It is also possible to prevent the composite material and the joining member from deteriorating due to galvanic corrosion, which occurs in the case of using the staple of metal.

In the present embodiment, it has been explained that the staple 24 is made of the reinforced fiber impregnated with thermoplastics resin, but the present invention is not limited to this, and reinforced fiber impregnated with thermosetting resin may also be used. In the case of using the thermosetting resin, the reinforced fiber and resin are heated at a high temperature so as to be hardened.

In the present embodiment, it has been explained that the end portions 24*a*, 24*b* of the staple 24 are cured and maintained so as to be joined to each other, but the present invention is not limited to this, for example, after the end portions 24*a*, 24*b* are bent, they are stuck on the surface of the layer 1*a* of the composite material, and then are pressed and maintained so that the end portions 24*a*, 24*b* and the layer 1*a* of the composite material are hardened and joined at a time. In this case, firmer joining can be secured because the end portions 24*a*, 24*b* are fixed to the surface of the layer 1*a*, compared to the case of merely joining the bent end portions 24*a*, 24*b*.

After the end portions 24*a*, 24*b* of the staple 24 made of the composite fiber are bent and cured, these hardened end portions 24*a*, 24*b* may be stuck with adhesive onto the surface of the layer 1*a* of the composite material. In this case, although the sticking process is additionally required, firmer joining can be secured, compared to the case of simply bending and joining the end portions 24*a*, 24*b*.

REFERENCE SIGNS LIST

1*a*, 1*b* Layers of composite material
3 Delamination
4 Hole
6 Staple (Joining member)

The invention claimed is:

1. A repairing method for repairing a delamination formed between layers of a hardened composite material, wherein the composite material is used for an aircraft, and is a laminated structure including at least a first layer of the composite material and a second layer which is laminated on the first layer and is a part of the composite material, and is hardened, wherein an object to be repaired by the repairing method is an area define the delamination where the first layer is partially separated from the second layer so as to form a gap between the first layer and the second layer which are cured and bound, wherein the method comprises:

drilling a hole in both the first layer and the second layer within the area defining the delamination, in a plan view of the area, so as to penetrate through the first layer and the second layer, joining the partially separated portion by inserting a joining member into the hole and joining the first layer and the second layer by drawing the first layer and the second layer together to eliminate the gap formed by the delamination; and applying a bending process to an end portion of the joining member that is inserted through the hole such that the first layer and the second layer remain joined together, wherein a size of a cross section area of the hole is smaller than a size of a cross section area of the partially separated portion, in a plan view of the composite material.

2. The repairing method for composite material according to claim 1, wherein sleeve is inserted into the hole, and the joining member is inserted through the sleeve.

3. The repairing method for composite material according to claim 1, wherein an end portion of the joining member is inserted through the hole, wherein the end portion of the joining member that is bent is inserted into a crimping member which is a hollow cylinder having an inner diameter that permits the end portion of the joining member to pass therethrough, and wherein the end portion of the joining member, which is inserted in the crimping member, is crimped by applying force onto an outer side of the crimping member.

4. The repairing method for composite material according to claim 1, wherein an end portion of the joining member that is inserted through the hole is covered with a sealant.

5. The repairing method for composite material according to claim 1, wherein galvanic corrosion resistance material is provided between the joining member and the layers of the composite material.

6. The repairing method for composite material according to claim 1, wherein the joining member is in a quadrilateral cross sectional shape perpendicular to an axial direction of the joining member, the axial direction being parallel to a direction in which the joining member is inserted into the hole.

7. The repairing method for composite material according to claim 1, wherein the joining member comprises a staple having plural legs.

8. The repairing method for composite material according to claim 7, wherein the staple is made of reinforced fiber.

9. The repairing method for composite material according to claim 1, wherein the joining member is provided with surface coating for galvanic corrosion prevention.

10. The repairing method for composite material according to claim 1, wherein the joining member is made of shape memory alloy.

11. The repairing method for composite material according to claim 1, wherein end portions of the joining member that are bent are hooked to respective hook portions of a constraining member which is stuck on a surface of the first layer of the hardened composite material, wherein the end portions, which are hooked to the respective hook portions, are bent to opposite sides relative to respective free ends of the hook portions, and wherein the free ends of the hook portions are disposed so as to be oriented in an opposite direction from each other.

12. A repairing method for repairing a delamination formed between layers of a hardened composite material, wherein the composite material is used for an aircraft, and is a laminated structure including at least a first layer of the composite material and a second layer which is laminated on the first layer and is part of the composite material, and is hardened, wherein an object to be repaired by the repairing method is an area defining the delamination, where the first layer is partially separated from the second layer so as to form a gap between the first layer and the second layer which are cured and bound, wherein the method comprises:

drilling a plurality of holes through both the first layer and the second layer within the area defining the delamination so as to penetrate through the first layer and the second layer; and joining the partially separated portion by inserting a joining member into the holes and joining the first layer and the second layer by drawing the first layer and the second layer together to eliminate the gap formed by the delamination, such that the first layer and the second layer remain joined together due to bending of the joining member, wherein a size of a cross section area of each of the holes is smaller than a size of a cross section area of the partially separated portion, in a plan view of the composite material, and wherein the joining member is a staple having a plate-like staple body which extends in an extending direction of the first layer and which contacts the first layer, a first pair of legs extending perpendicularly to the extending direction and from a pair of sides of the staple body which oppose each other in a first opposing direction, and a second pair of legs extending perpendicularly to the extending direction and from another pair of sides of the staple body which oppose each other in a second opposing direction which is perpendicular to the first opposing direction, wherein the first pair of legs and the second pair of legs are inserted into the holes, respectively.

* * * * *